(12) United States Patent
Romein

(10) Patent No.: US 11,524,560 B1
(45) Date of Patent: Dec. 13, 2022

(54) RETRACTABLE JEEP TOP AND ASSOCIATED METHODS

(71) Applicant: Daniel Romein, St. Augustine, FL (US)

(72) Inventor: Daniel Romein, St. Augustine, FL (US)

( * ) Notice: Subject to any disclaimer, the term of this patent is extended or adjusted under 35 U.S.C. 154(b) by 0 days.

(21) Appl. No.: 17/659,470

(22) Filed: Apr. 15, 2022

Related U.S. Application Data

(60) Provisional application No. 63/175,154, filed on Apr. 15, 2021.

(51) Int. Cl.
*B60J 7/12* (2006.01)
*B60J 7/00* (2006.01)

(52) U.S. Cl.
CPC ........... *B60J 7/1269* (2013.01); *B60J 7/0015* (2013.01)

(58) Field of Classification Search
None
See application file for complete search history.

(56) References Cited

U.S. PATENT DOCUMENTS

| 8,419,119 B2* | 4/2013 | Nakamura | ............. B60J 7/0015 |
| | | | 160/265 |
| 9,493,057 B1* | 11/2016 | Noda | .................... B60J 7/0435 |

FOREIGN PATENT DOCUMENTS

| EP | 2902260 A2 * | 8/2015 | ............ B60J 7/0015 |
| WO | WO-2009026904 A1 * | 3/2009 | ............ B60J 7/0015 |

\* cited by examiner

*Primary Examiner* — Joseph D. Pape
(74) *Attorney, Agent, or Firm* — Ashkan Najafi

(57) ABSTRACT

A multi-functional retractable JEEP® top includes a support frame affixed to a top opening of an existing JEEP®, a top layer deployment section selectively biased between wound and unwound positions, a bottom layer deployment section disposed subjacent to the top layer deployment section and independently biased between wound and unwound positions, a controller for manipulating the top layer deployment section and the bottom layer deployment section upon receiving a user input, and a power source communicatively coupled to the controller. Each of the top layer deployment section and the bottom layer deployment section span across at least one portion of the top opening of the existing JEEP®.

11 Claims, 27 Drawing Sheets

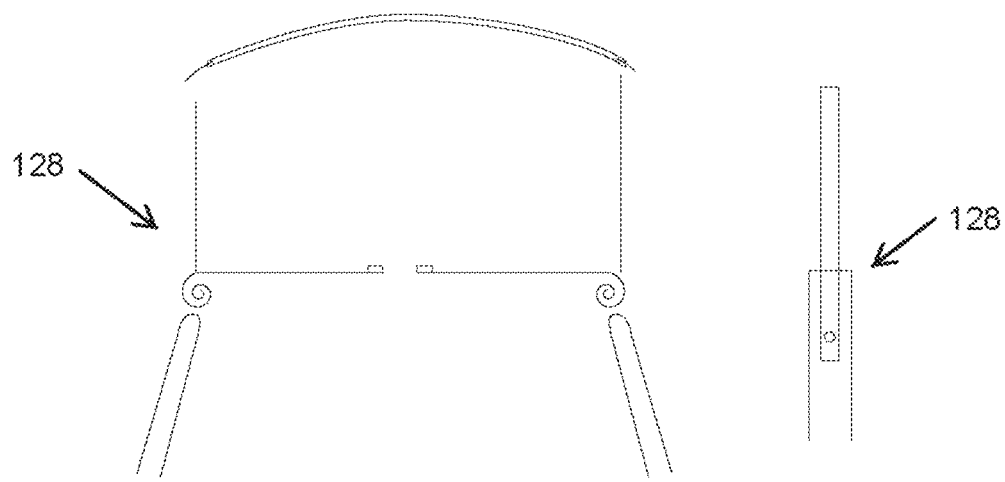
FIG. 27
FIG. 27a
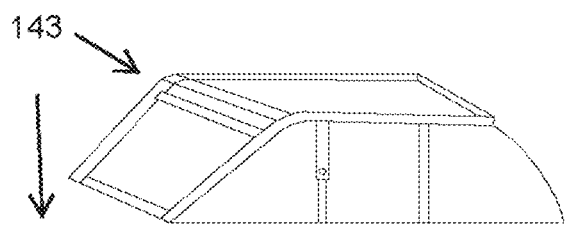
FIG. 27b
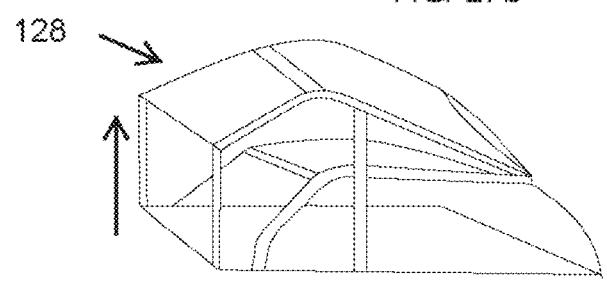
FIG. 27c

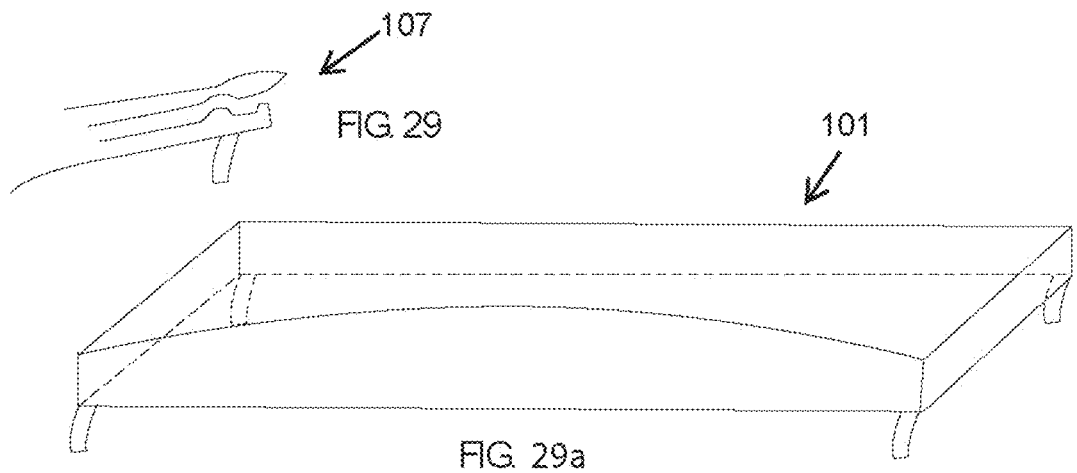
FIG. 29
FIG. 29a
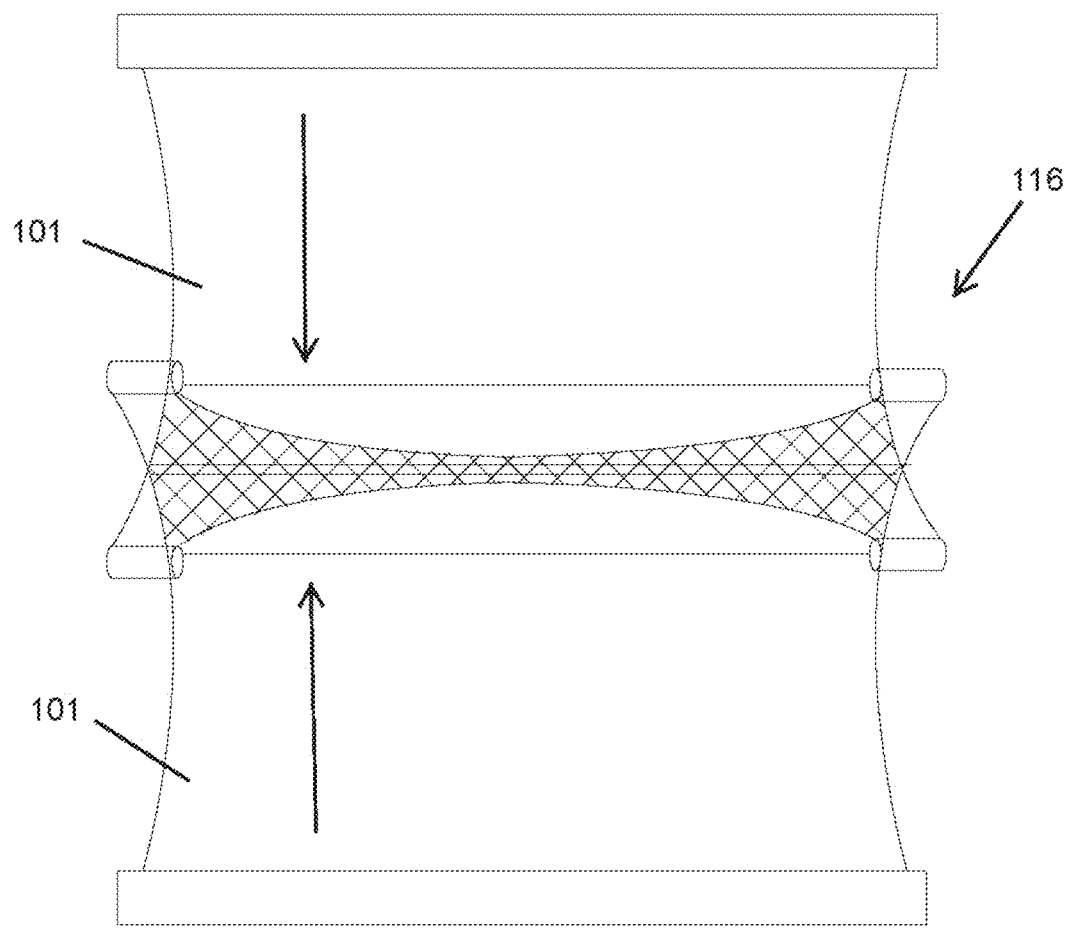
FIG. 29b

RETRACTABLE JEEP TOP AND ASSOCIATED METHODS

CROSS REFERENCE TO RELATED APPLICATIONS

This is a non-provisional patent application that claims priority to and benefit of U.S. provisional patent application No. 63/175,154 filed Apr. 15, 2021, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to retractable JEEP® tops and, more particularly, to a specially configured multi-functional retractable JEEP® top for selectively and independently deploying a top layer at tensioned positions, a bottom layer, and an exterior side pull-out shade, as desired by a user.

Prior Art

Off-road vehicles such as the JEEP® Wrangler® are popular among outdoor enthusiasts because of their rugged build and appearance and consequent ability to move over terrain where other vehicles cannot tread. The Wrangler® models have open passenger compartments and an open rear compartment. Factory soft tops are available for these vehicles that can be manually attached to the vehicle with snaps, a belt rail system, locking tabs, and the like to enclose the passenger and rear compartments. Factory tops, however, are cumbersome to install and can require several minutes for complete deployment.

Some past attempts to create an easily deployable soft top for the JEEP® Wrangler® have been made, but with limited success. For example, a manually deployable soft top attaches to the floor of the rear compartment and is deployable from a folded configuration in the rear compartment to a deployed configuration covering the passenger and rear compartments of the vehicle.

One problem in designing a deployable top for the JEEP® Wrangler® vehicles is that the rear edges of the back doors in four-door models are very close to the rear compartment, where a retractable top would naturally be stowed. Further, the top edges of the doors are relatively high compared to the height of the belt rail surrounding the rear compartment. As a consequence, a retractable top for these vehicles must deploy first upwardly from the rear compartment virtually to its complete unfolded configuration and then pivot downwardly intact over the passenger compartment. This has heretofore been a significant challenge. Further, the sides of the top rails must spread out as the top pivots downwardly primarily because the passenger compartment of JEEP® brand vehicles is slightly wider at its rear end than at its front end. The top rails also need to spread to accommodate door edges, roll bars, and other features of the vehicle. As the top approaches full deployment, the top rails must narrow back together. Accommodating this motion also is a challenge.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially configured multi-functional retractable JEEP® top for selectively and independently deploying a top layer at tensioned positions, a bottom layer, and an exterior side pull-out shade, as desired by a user. These and other objects, features, and advantages of the non-limiting exemplary embodiment(s) are provided by a multi-functional retractable JEEP® top including a support frame affixed to a top opening of an existing JEEP®, a top layer deployment section selectively biased between wound and unwound positions, a bottom layer deployment section disposed subjacent to the top layer deployment section and independently biased between wound and unwound positions, a controller for manipulating the top layer deployment section and the bottom layer deployment section upon receiving a user input, and a power source communicatively coupled to the controller. Advantageously, each of the top layer deployment section and the bottom layer deployment section span across at least one portion of the top opening of the existing JEEP®.

In a non-limiting exemplary embodiment, the top layer deployment section includes a top window layer, a header statically mated to a leading edge of the top window layer wherein the header includes a plurality of slits therein and is flexibly configured to provide an angled press seal against the top window layer deployed to an open position, a plurality of roll tensioners attached to the support frame and operably engaged to the top window layer for flexing and tensioning the header to thereby seal the top window layer against the top opening of the JEEP®, and a plurality of deployment mechanisms configured to selectively bias the top window layer between open and closed positions. Advantageously, the header spans between the roll tensioners and travels parallel to a y-axis between the deployment mechanisms.

In a non-limiting exemplary embodiment, the roll tensioners are equidistantly spaced apart on opposite sides of the y-axis. Each roll tensioner includes a cylindrical hollow tube having a slit extended along a major longitudinal length thereof, and a spring-coiled spool housed within the cylindrical hollow tube and axially aligned along the major longitudinal length thereof. Advantageously, opposed longitudinal edges of the top window layer each are channeled through the slit and anchored to the spring-coiled spool such that the top window layer travels parallel to the y-axis when actuated by the deployment mechanisms.

In a non-limiting exemplary embodiment, the deployment mechanisms are oppositely spaced apart at axially opposed ends of the roll tensioners and registered orthogonal thereto. Each deployment mechanism includes a housing, and a spring-coiled spool rotatably disposed within the housing, and a header pull line anchored to the header and wound about one of the spring-coiled spools disposed within one of the housings.

In a non-limiting exemplary embodiment, the roll tensioners cooperate with the top layer deployment section and are configured to maintain the top window layer at a first tensioned position, when the top window layer is at a wound closed position, and biased to a second tensioned positioned when the top window layer is an unwound open position.

In a non-limiting exemplary embodiment, the second tensioned position is greater than the first tensioned position thereby causing the header to rise upwardly to a bowed position for maintaining the top window layer sealed at the top opening of the JEEP®. Such a structural configuration provides the new, useful, and unexpected benefit of stabilizing the top window layer and preventing undesirably flapping during driving conditions.

In a non-limiting exemplary embodiment, each of the cylindrical hollow tubes have a proximal end and an axially opposed distal end. Advantageously, during deployment of the top window layer to the open position, the proximal end rotates about a fulcrum rotational axis while the distal end contemporaneously rotates about the fulcrum axis and linearly travels parallel to the x-axis towards a center point between the roll tensioners such that the header is flexed upwardly to a bowed position at the second tensioned position.

In a non-limiting exemplary embodiment, during retraction of the top window layer to the closed position, the proximal end oppositely rotates about the fulcrum rotational axis while the distal end contemporaneously rotates opposite about the fulcrum axis and linearly travels parallel to the x-axis away from the center point between the roll tensioners such that the header is relaxed downwardly to a planar position at the first tensioned position.

In a non-limiting exemplary embodiment, the present disclosure further includes at least one exterior side pull-out shade section anchored to the support frame and disposed generally above a door of the existing JEEP®. Such an exterior side pull-out shade is independently operable of the top layer deployment section and the bottom layer deployment section. Advantageously, the at least one exterior side pull-out shade section is operably coupled to the controller and is configured to deploy outwardly and away from the door of the existing JEEP®.

In a non-limiting exemplary embodiment, the present disclosure further includes a JEEP® top lifting section for selectively raising and lowering a rear portion of the top layer deployment section to height above an initial resting position.

In a non-limiting exemplary embodiment, as perhaps best shown in FIGS. 34-38a, the multi-functional retractable JEEP® top includes a support frame affixed to a top opening of an existing JEEP® wherein the support frame is configured to operably support five separate windows. For example, the support frame may dynamically displace one or more of a front window, a back window, a rear hatch window, a left-side rear hatch window, and a right-side rear hatch window. Each of the five windows may have at least one top window layer, and a bottom scrolling layer (e.g., mesh layer, tinted layer, clear layer, exposed (open) layer, etc.). Additional side windows may also include an exterior side pull-out shade.

In a non-limiting exemplary embodiment, the front window and the back window each may have a plurality of bottom scrolling layers such that a user can selectively manipulate and customize a configuration of the bottom scrolling layers as needed. For example, the bottom scrolling layer may be tinted on a passenger side and clear (open) on a driver side of the front window and the back window. A variety of configurations may be employed.

In a non-limiting exemplary embodiment, the rear hatch window may also have a plurality of bottom scrolling layers as described hereinabove. In addition, the rear hatch window may articulate about a fulcrum axis and operate via a plurality of pneumatic pistons anchored to the support frame, as shown in FIG. 33.

In a non-limiting exemplary embodiment, referring to FIGS. 34 and 35, each of the left-side and right-side hatch windows slidably reciprocate, between open and closed positions, along a linear longitudinal path defined parallel to left and right sides of the vehicle.

In a non-limiting exemplary embodiment, referring to FIG. 34, the five windows are illustrated at an initial resting position. Deployment of such windows are illustrated in FIG. 35-38a. In particular, window C may remain stationery and windows A and B may rearwardly retract beneath window C. In this manner, windows A and B stop when each is horizontally stacked beneath window C. Window D initially articulates to a horizontal position, then forwardly retracts beneath window C such that window D is horizontally stacked and aligned with windows A-C. A variety of deployment mechanisms may be employed to slidably retract windows A, B, and D to the horizontally stacked orientation shown in FIG. 35. For example, longitudinal guide rails may direct rotational gears 160 along linear longitudinal travel paths for each of the dynamic windows. It is noted that window C may be stationary, while windows A, B, and D may be dynamic. However, the window deployment configuration may be calibrated to allow any one of windows A-D to remain stationary. Also, the arrangement of windows A-D may be altered such that they are stacked in a different order.

In a non-limiting exemplary embodiment, referring to FIG. 35, window F may remain stationery while window E contemporaneously reciprocates along a linear longitudinal path as window D reciprocates between its horizontally stacked position (open) and initial resting position (closed). Window E is located on both left and right sides of the vehicle and may operate in tandem with window D. Guide brackets are attached to the vehicle support frame and rear hatch window D. Of course, window E may be disconnected from window D, if desired.

In a non-limiting exemplary embodiment, referring to FIG. 36, a perspective view of the vehicle's front windshield is shown wherein a top portion of the front windshield includes an arcuately shaped plastic molding spanning across a width of the front windshield. Such a plastic molding seals a leading front edge of the top window layer to the upper edge of the front windshield. In this manner, the arcuately shaped plastic molding serves as a coupling that receives the front edge of the dynamic top window layer as it returns to a retracted (closed) position adjacent to the front windshield.

In a non-limiting exemplary embodiment, referring to FIGS. 38-38a, a cross-sectional view and a perspective view of the deployment mechanism is illustrated. The support frame is anchored to the vehicle's roll bars on the left side and right side of the vehicle. A plurality of brackets are operably engaged and coupled to the support frame and the top window layer, respectively. Each bracket includes a lateral groove and an oppositely facing medial groove. The medial groove is statically attached to a left side and a right side of the top window layer. The lateral groove is dynamically engaged to an inwardly facing edge of the support frame. In this manner, the bracket and the top window layer are contemporaneously guided along the inwardly facing edges of the support frame and thereby reciprocated between open and closed positions. Of course, such brackets and the top window layer may be displaced via a variety of deployment mechanisms including motorized gears tracks, pulleys, rollers, etc.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
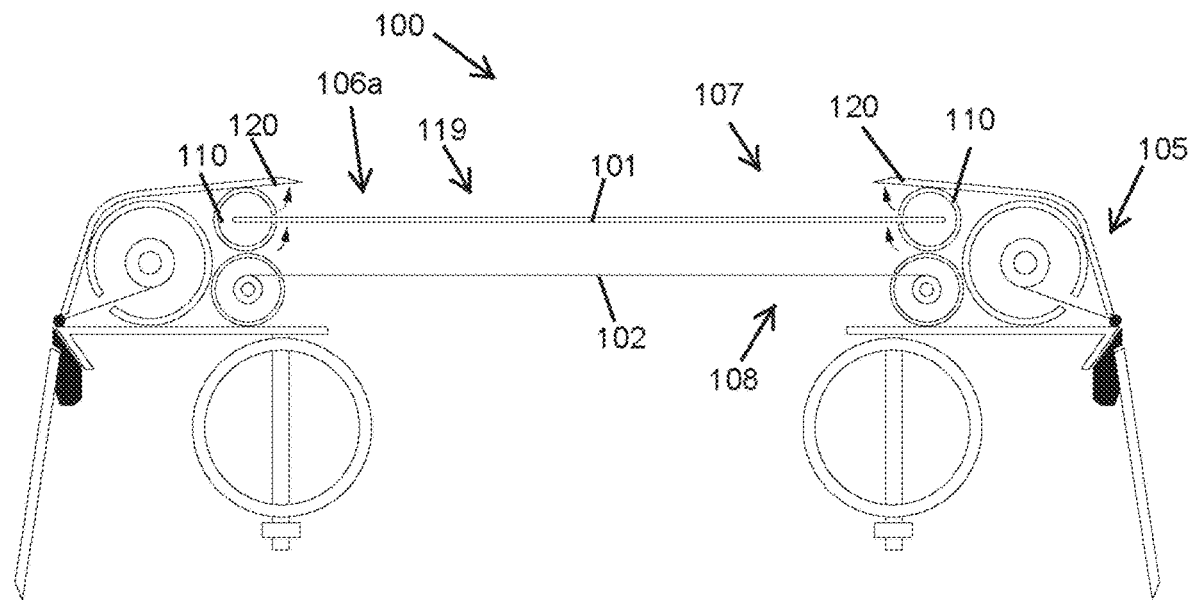
FIG. 1 is a front elevational view of a retractable JEEP® top before a top window layer and associated roll tensioner and seal are deployed, in accordance with a non-limiting exemplary embodiment of the present disclosure.
Figure 2:
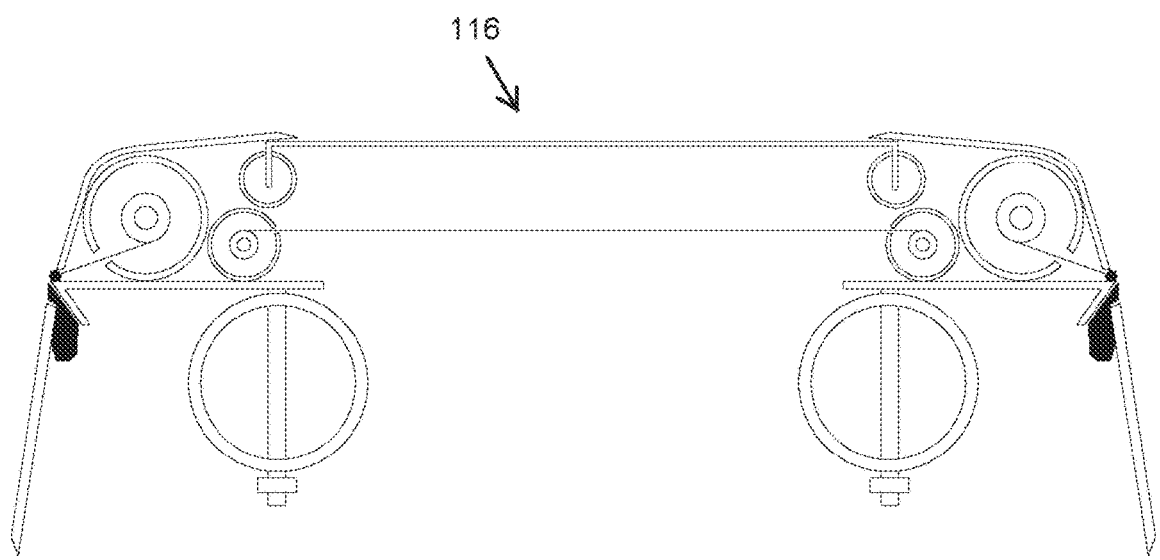
FIG. 2 is another front elevational view of a retractable JEEP® top after the top window layer and associated roll tensioner and seal are deployed, in accordance with a non-limiting exemplary embodiment of the present disclosure.
Figure 3:
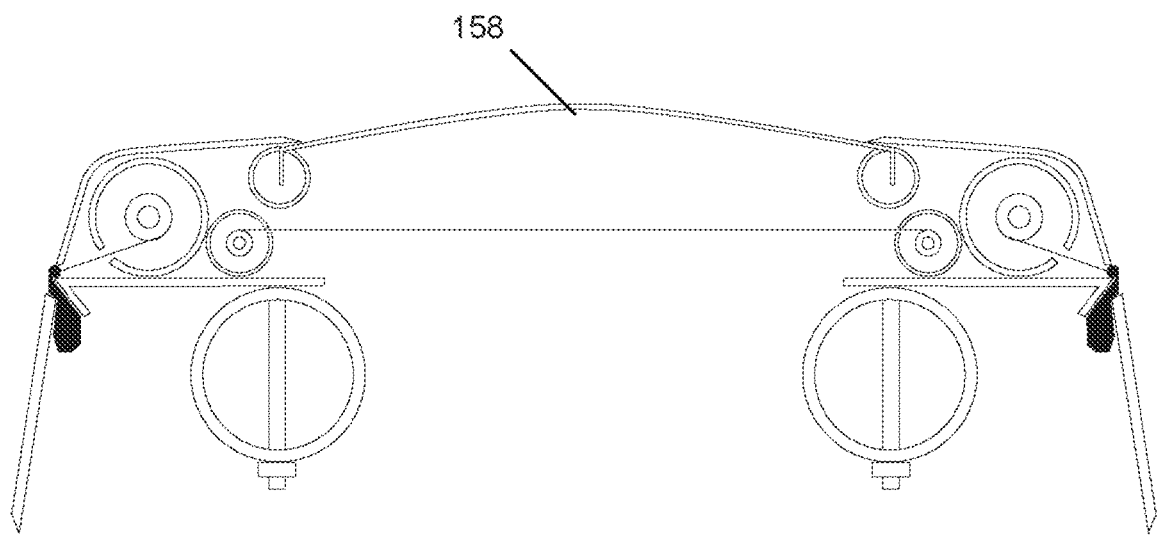
FIG. 3 is another front elevational view of a retractable JEEP® top after the top window layer and associated roll tensioner and seal are deployed at a header end of the window, in accordance with a non-limiting exemplary embodiment of the present disclosure.
Figure 4:
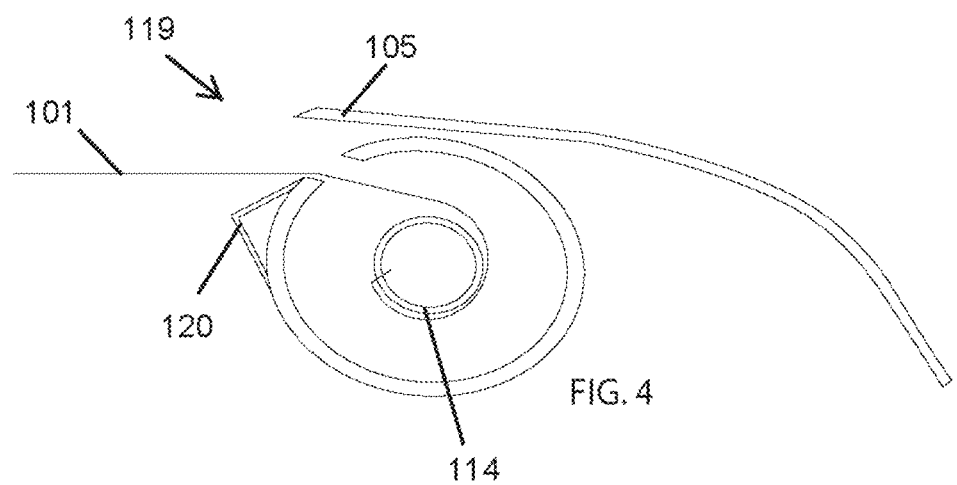
FIG. 4 is an enlarged side elevational view showing the spring coil and top window layer partially rotated towards a back seal located opposite of the header, in accordance with a non-limiting exemplary embodiment of the present disclosure.
Figure 4A:
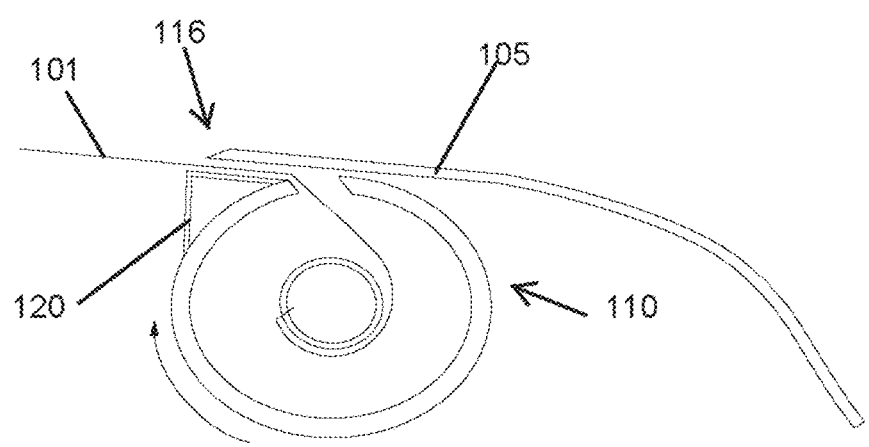
FIG. 4a is another enlarged side elevational view showing the spring coil and top window layer further rotated towards the back seal located opposite of the header, in accordance with a non-limiting exemplary embodiment of the present disclosure.
Figure 5:
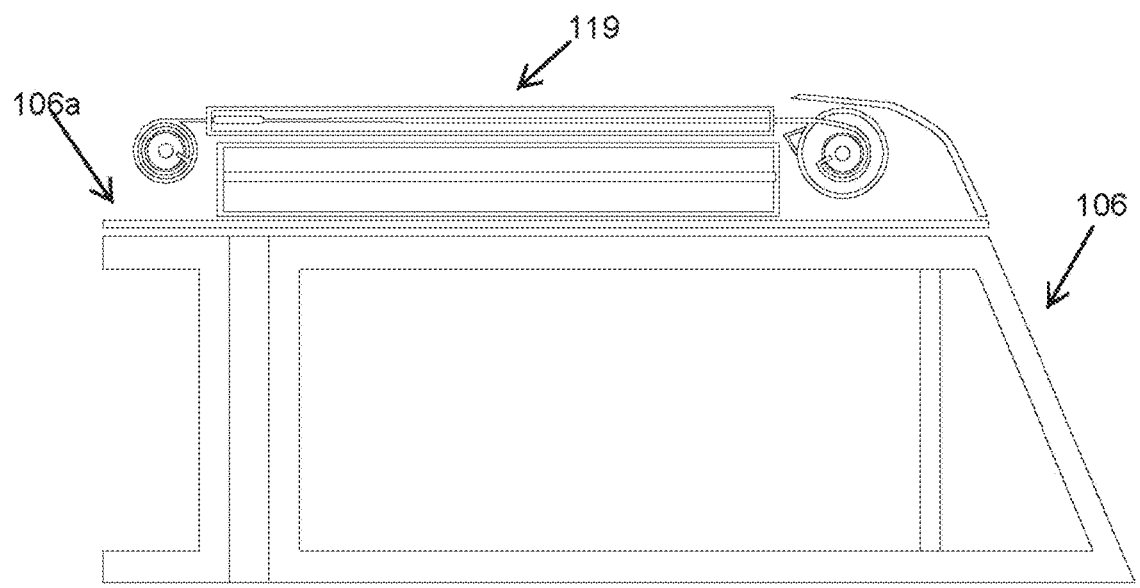
FIG. 5 is a side elevational view showing the top window layer at a closed position before the roll tensional and seal are deployed to close the top window layer.
Figure 6:
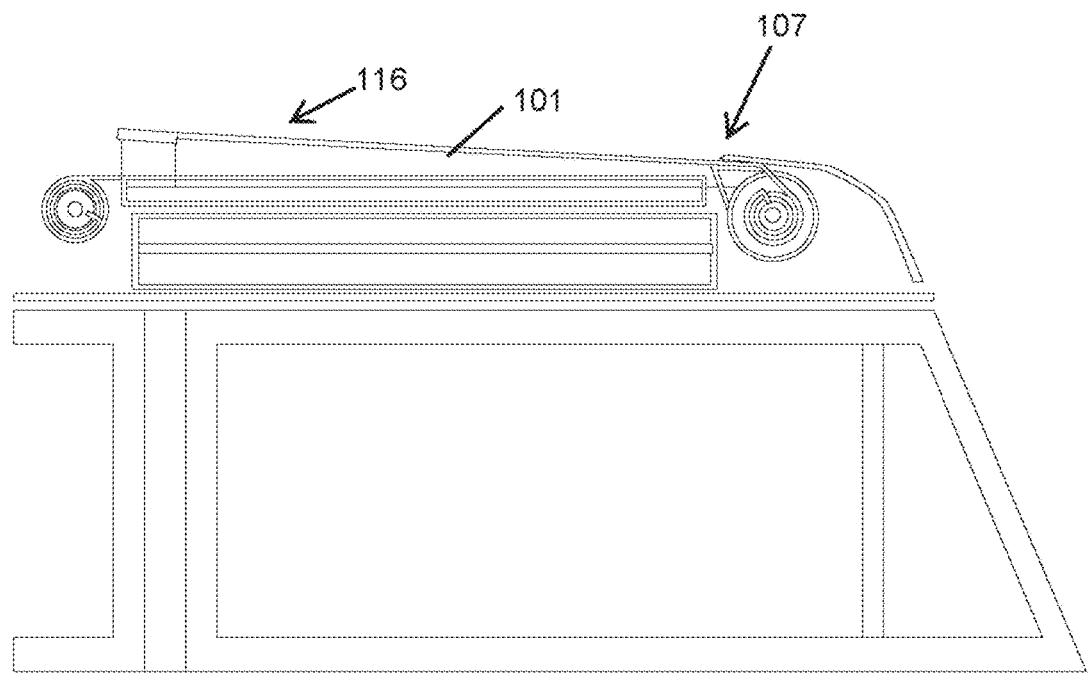
FIG. 6 is another side elevational view showing the top window layer at a closed position after the roll tensional, seal, and header are deployed to close the top window layer.
Figure 7:
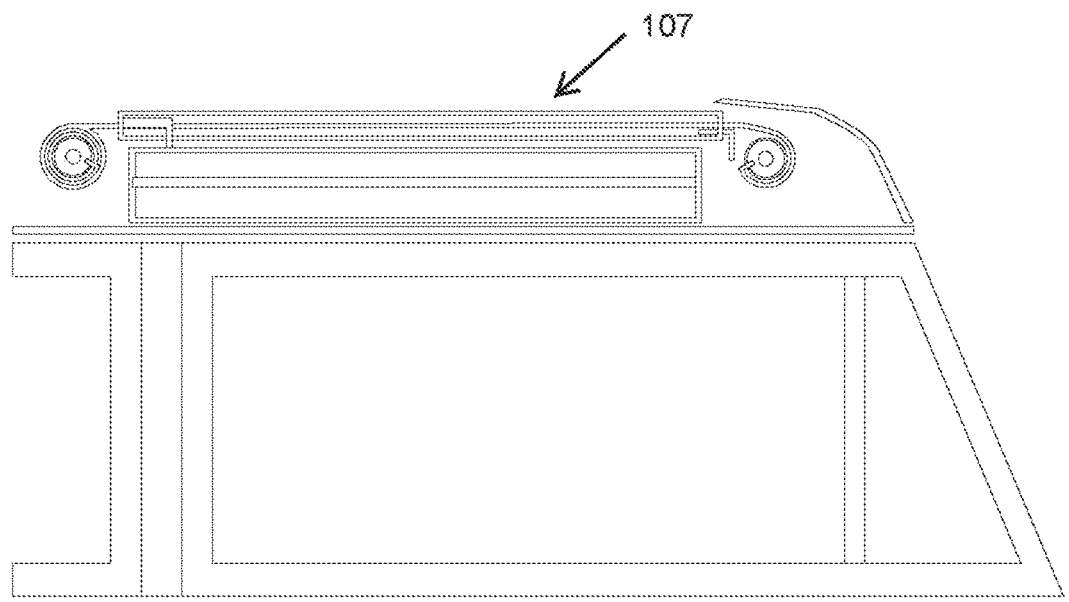
FIG. 7 is another side elevational view showing the top window layer at a closed position before the roll tensioner and front press seal metal angles are deployed to close the top window layer.
Figure 7A:
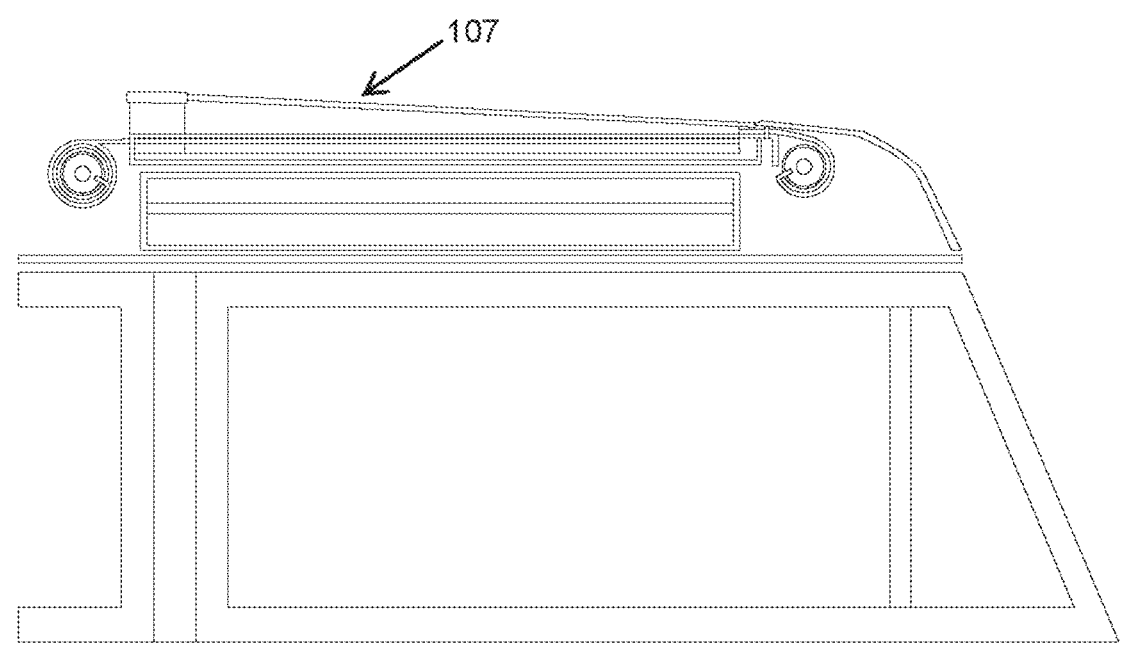
FIG. 7a is another side elevational view showing the top window layer at a closed position after the roll tensioner and front press seal metal angles are deployed to close (seal) the top window layer.
Figure 8:
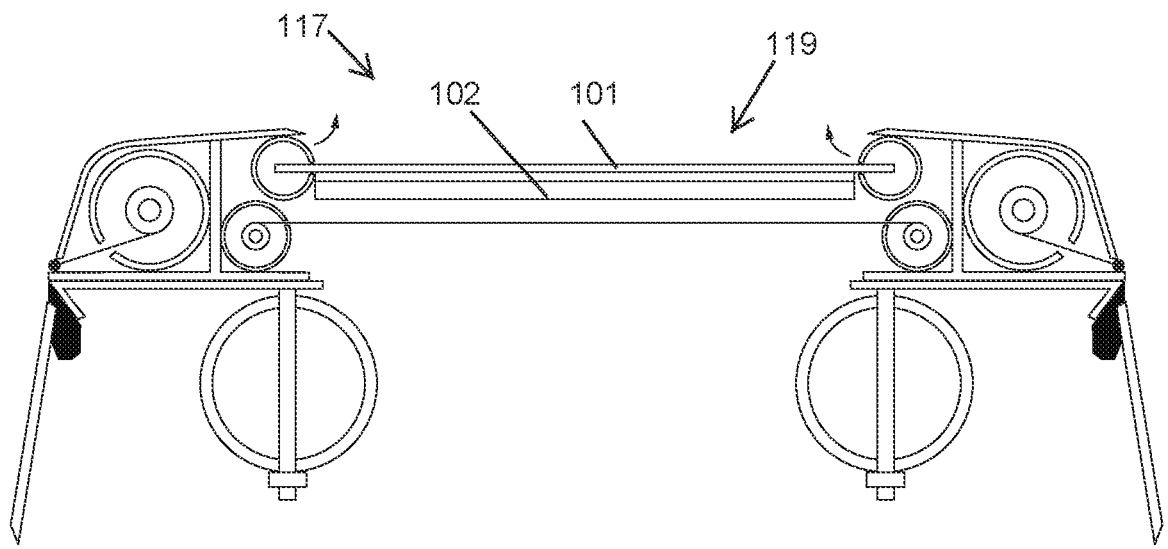
FIG. 8 is another front elevational view of a retractable JEEP® top before the top window layer, the associated roll tensioner, and the front press seal metal angles are deployed to close (seal) the top window layer, in accordance with a non-limiting exemplary embodiment of the present disclosure.
Figure 9:
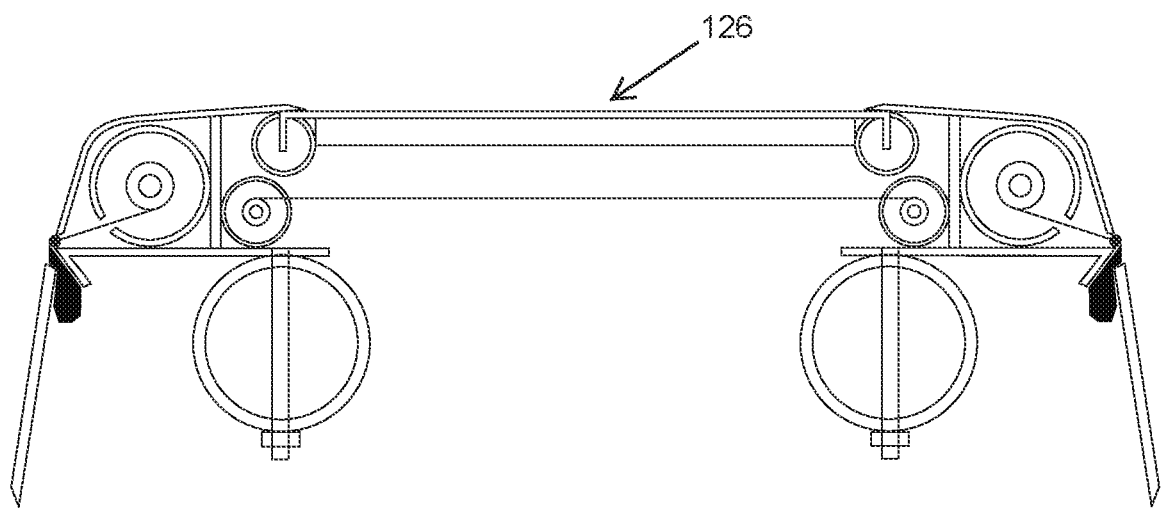
FIG. 9 is another front elevational view of a retractable JEEP® top after the top window layer, the associated roll tensioner, and the front press seal metal angles are deployed to close (seal) the top window layer, in accordance with a non-limiting exemplary embodiment of the present disclosure.
Figure 10:
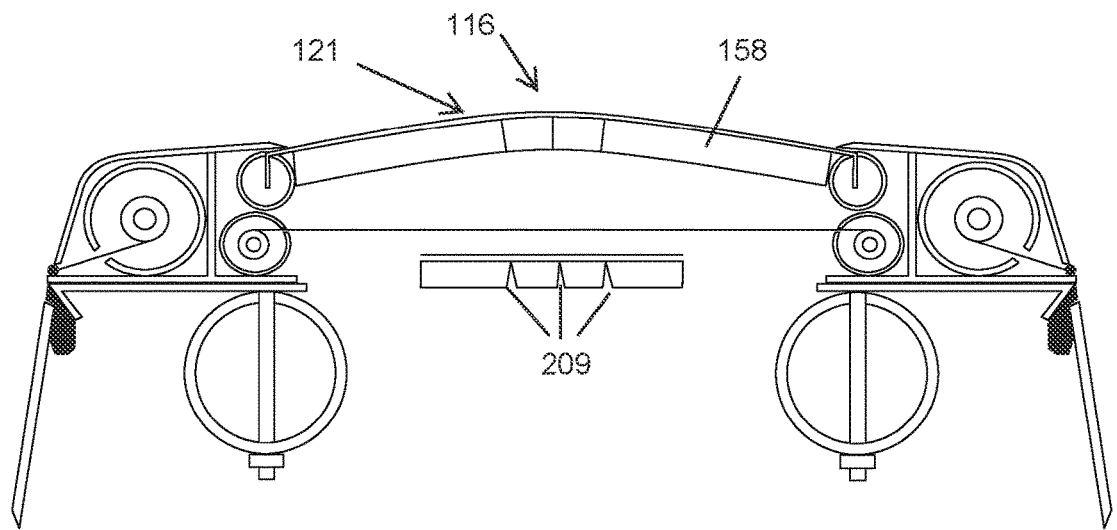
FIG. 10 is another front elevational view of a retractable JEEP® top at the header end after the top window layer, the associated roll tensioner, the header, and the front press seal metal angles (at the header end) are deployed to close (seal) the top window layer, in accordance with a non-limiting exemplary embodiment of the present disclosure.
Figure 11:
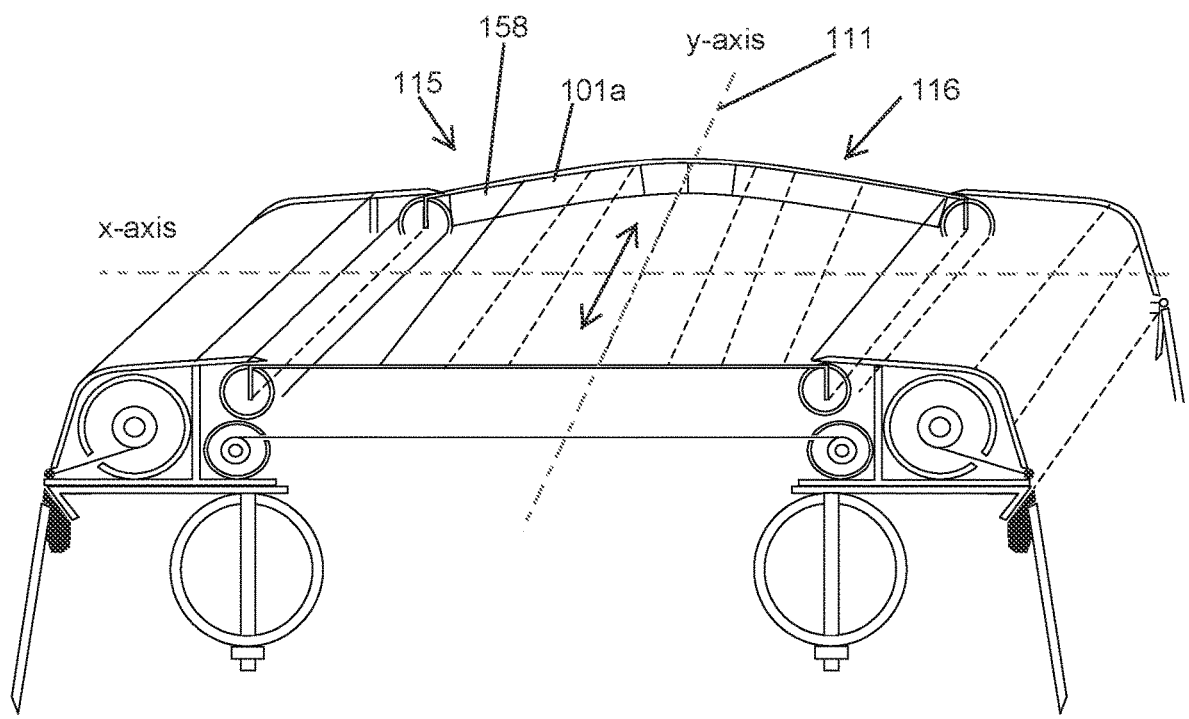
FIG. 11 is a perspective view of a retractable JEEP® top after the top window layer, the associated roll tensioner and the front and rear press seal metal angles are deployed to close (seal) the top window layer, in accordance with a non-limiting exemplary embodiment of the present disclosure.
Figure 12:
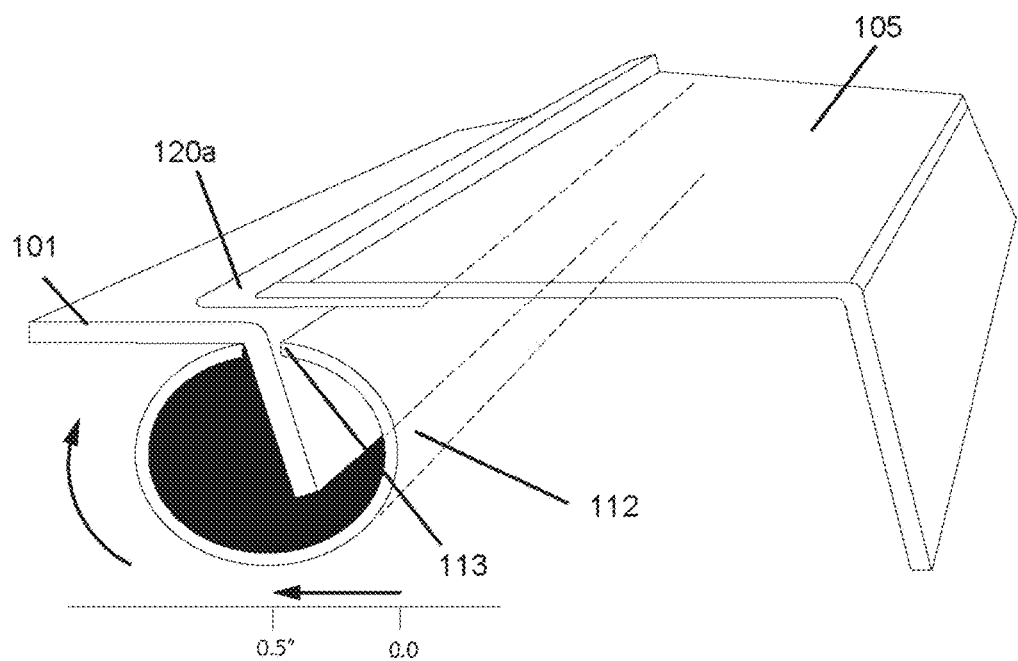
FIG. 12 is an enlarged perspective view of the window seal being guided along a linear path between a roll tensioner and a press seal metal angle, in accordance with a non-limiting exemplary embodiment of the present disclosure.
Figures 13, 13A:
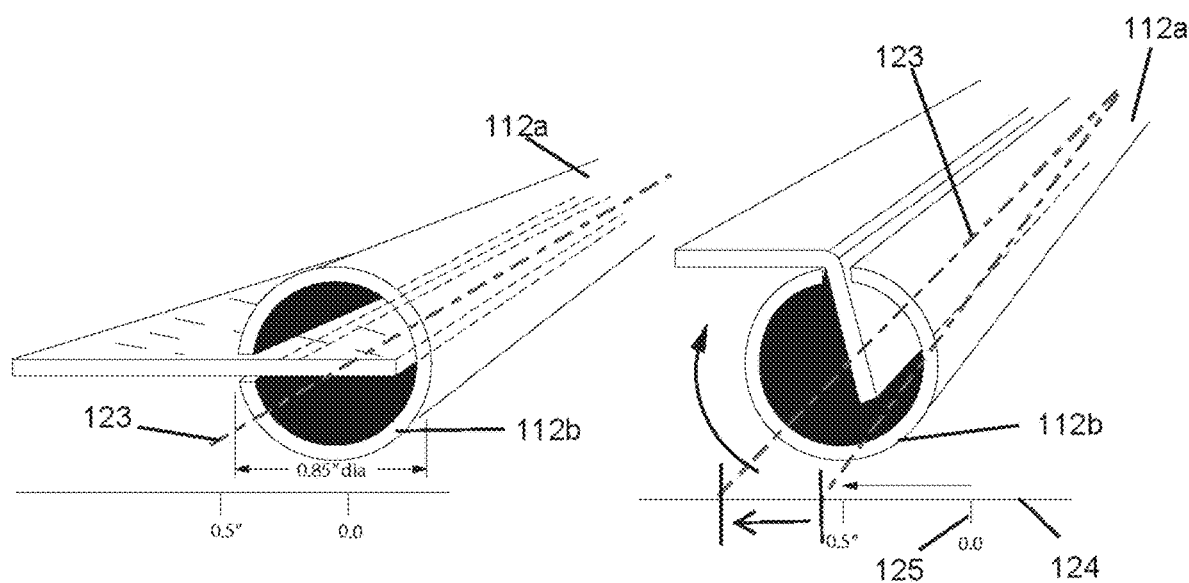
FIG. 13 is another enlarged perspective view of the window seal being guided along the linear path between the roll tensioner and a press seal metal angle, before rotation of the roll tensioner to a tensioned position, in accordance with a non-limiting exemplary embodiment of the present disclosure.
FIG. 13a is another enlarged perspective view of the window seal after being guided along the linear path between the roll tensioner and a press seal metal angle, after rotation of the roll tensioner to a tensioned position, in accordance with a non-limiting exemplary embodiment of the present disclosure.
Figure 14:
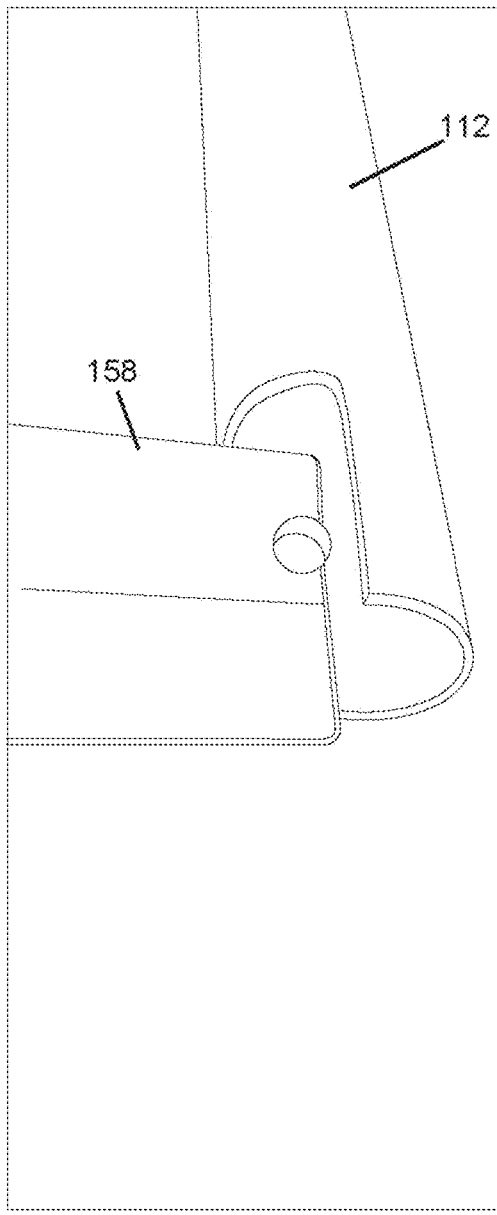
FIG. 14 is an enlarged perspective view showing the interrelationship between the roll tensioner and one end of the header, before rotation of the roll tensioner to the tensioned position, in accordance with a non-limiting exemplary embodiment of the present disclosure.
Figure 15:
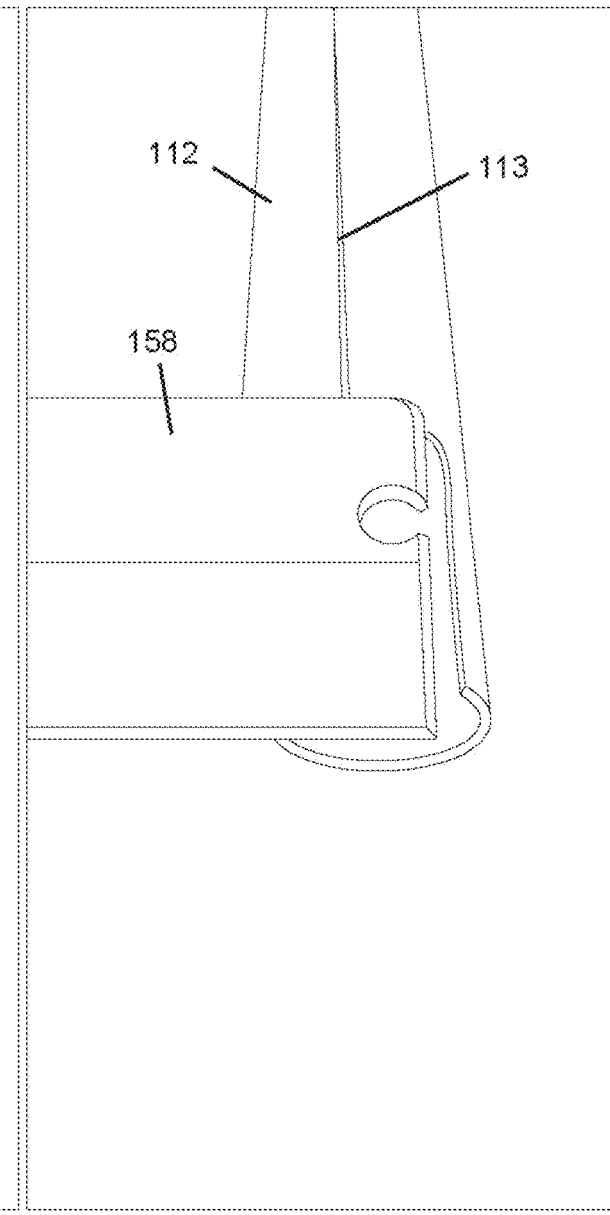
FIG. 15 is an enlarged perspective view showing the interrelationship between the roll tensioner and one end of the header, after rotation of the roll tensioner to the tensioned position, in accordance with a non-limiting exemplary embodiment of the present disclosure.
Figure 16:
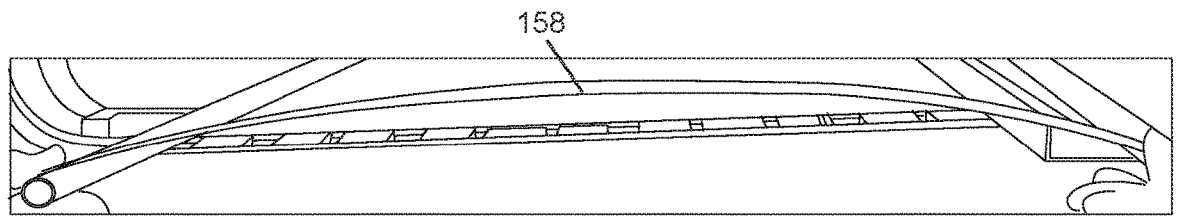
FIG. 16 is a front elevational view showing the header bowed to the tensioned position after the roll tensioners at opposite sides of the header are rotated to the tensioned positions, respectively, in accordance with a non-limiting exemplary embodiment of the present disclosure.
Figure 17:
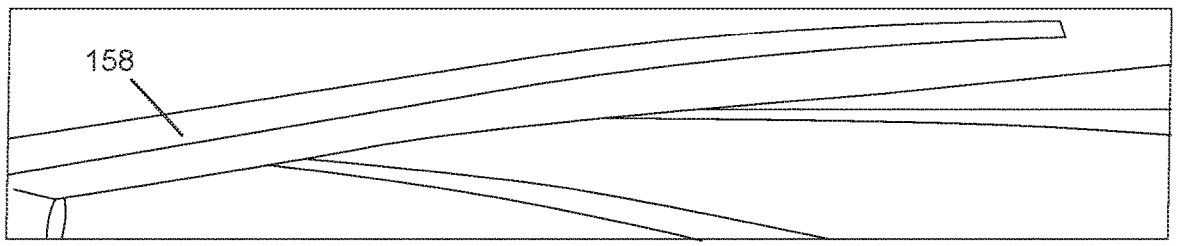
FIG. 17 is a perspective view showing the header bowed to the tensioned position above the JEEP® top opening, after the roll tensioners at opposite sides of the header are rotated to the tensioned positions, respectively, in accordance with a non-limiting exemplary embodiment of the present disclosure.
Figure 18:
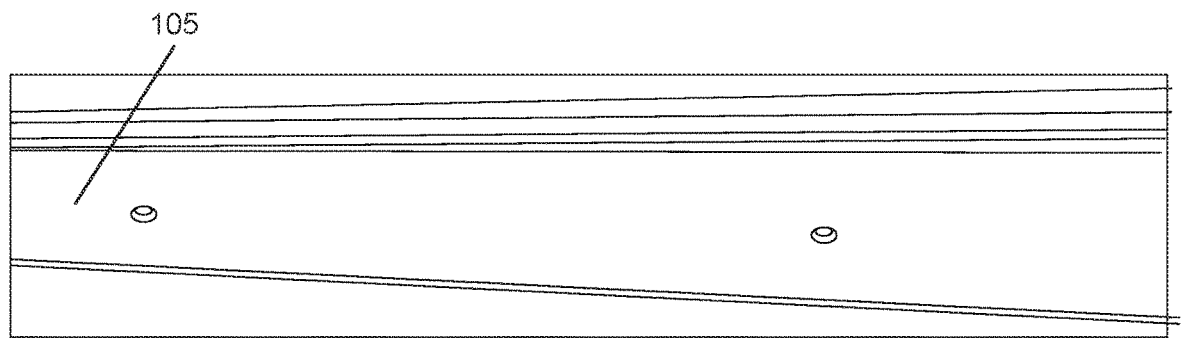
FIG. 18 is a perspective view showing a portion of the housing that is part of deployment mechanism for receiving and guiding the rubber seal edge portions of the top window layer, in accordance with a non-limiting exemplary embodiment of the present disclosure.
Figure 19:
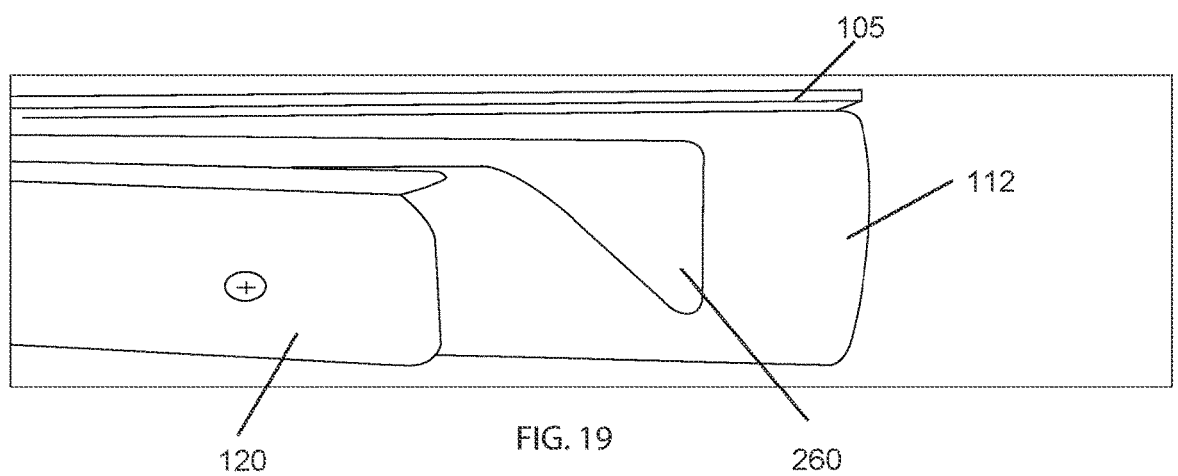
FIG. 19 is an enlarged side elevational view of the roll tensioner rotatable seated within the housing of the deployment mechanism, and having an obliquely shaped aperture for rotatable receiving and tensioning an axial end of the header therein, in accordance with a non-limiting exemplary embodiment of the present disclosure.
Figure 20:
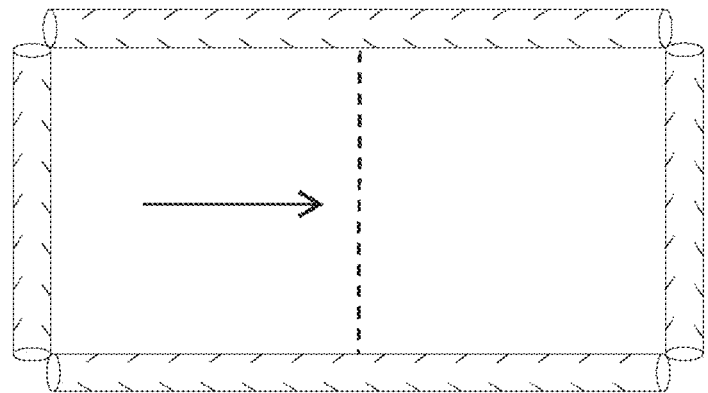
FIG. 20 is a top plan view illustrating a longitudinal displacement of a top window layer and/or a shade layer partially deployed along the top opening of the JEEP®, in accordance with a non-limiting exemplary embodiment of the present disclosure.
Figure 20A:
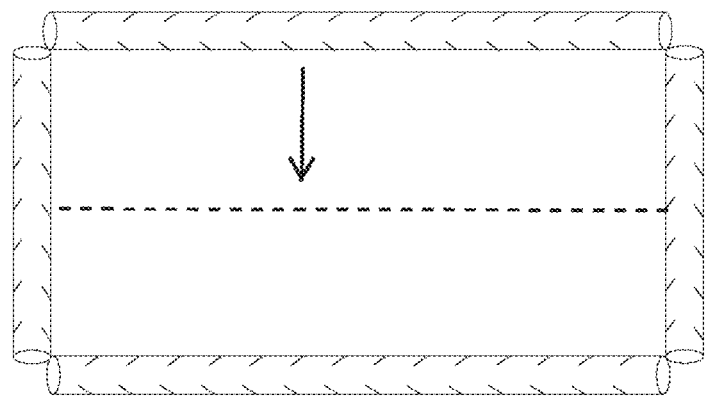
FIG. 20a is a top plan view illustrating a latitudinal displacement of a top window layer and/or a shade layer partially deployed along the top opening of the JEEP®, in accordance with a non-limiting exemplary embodiment of the present disclosure.
Figure 20B:
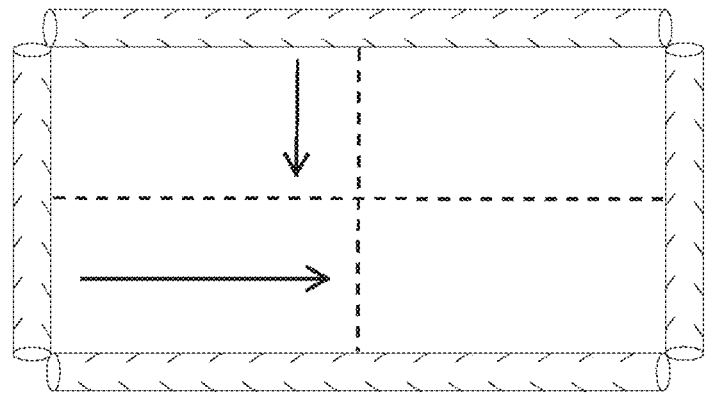
FIG. 20b is a top plan view illustrating both the longitudinal and latitudinal displacements of a top window layer and/or a shade layer partially deployed along the top opening of the JEEP®, in accordance with a non-limiting exemplary embodiment of the present disclosure.
Figure 21:
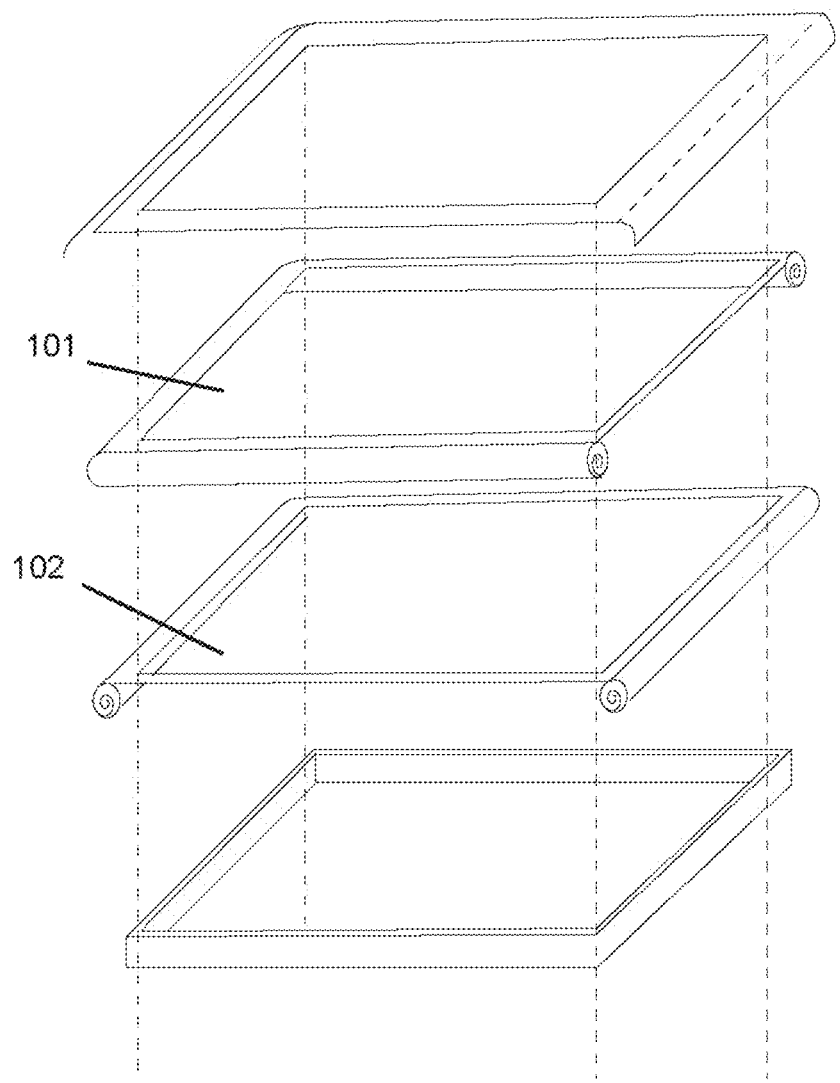
Figure 21A:
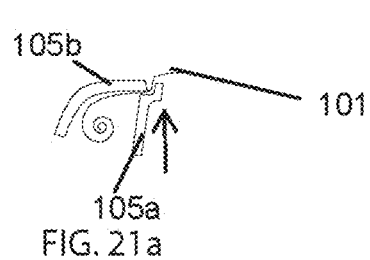
Figure 21B:
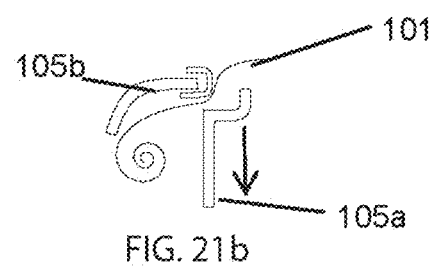
Figure 22:
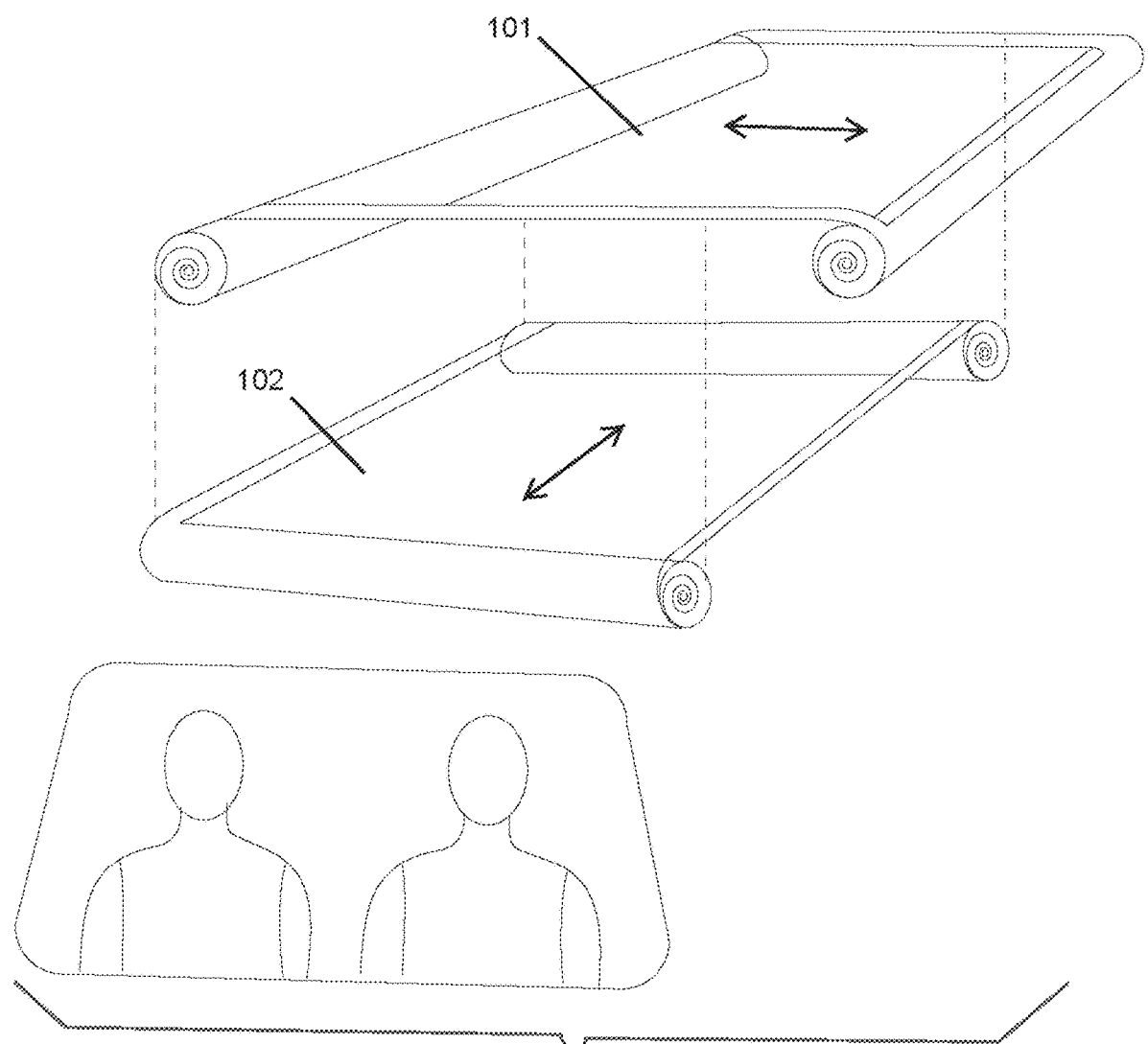
Figure 23:
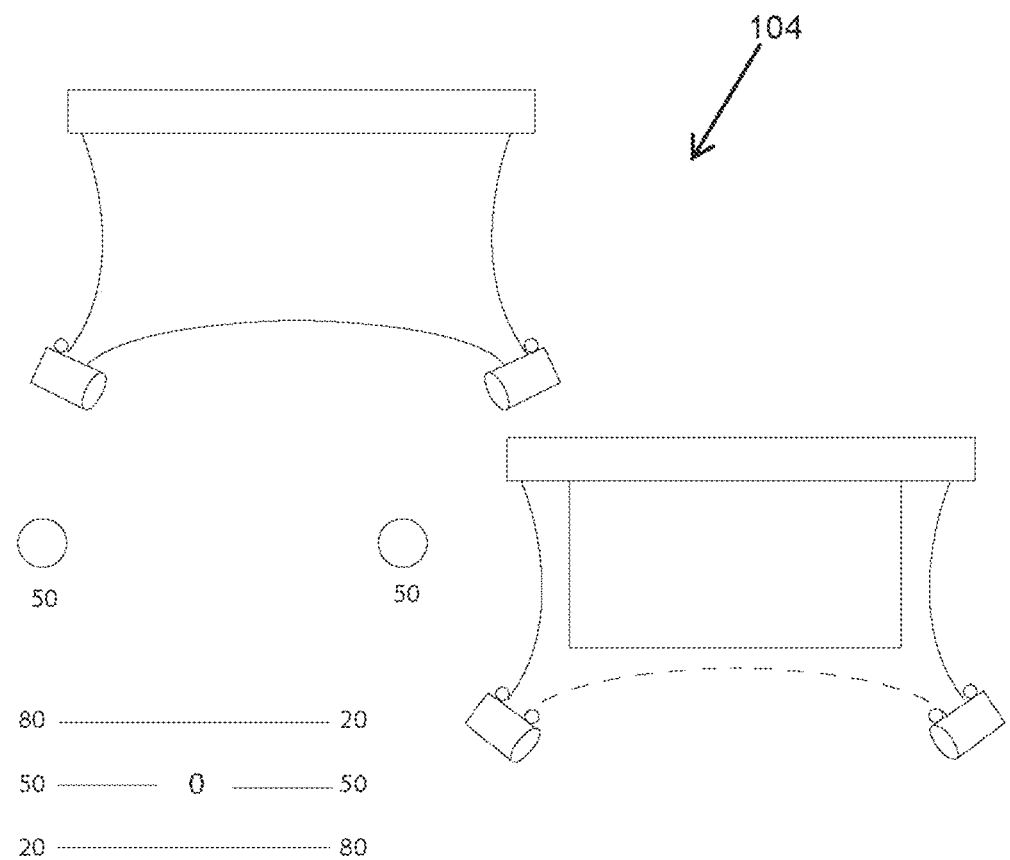
Figure 23:
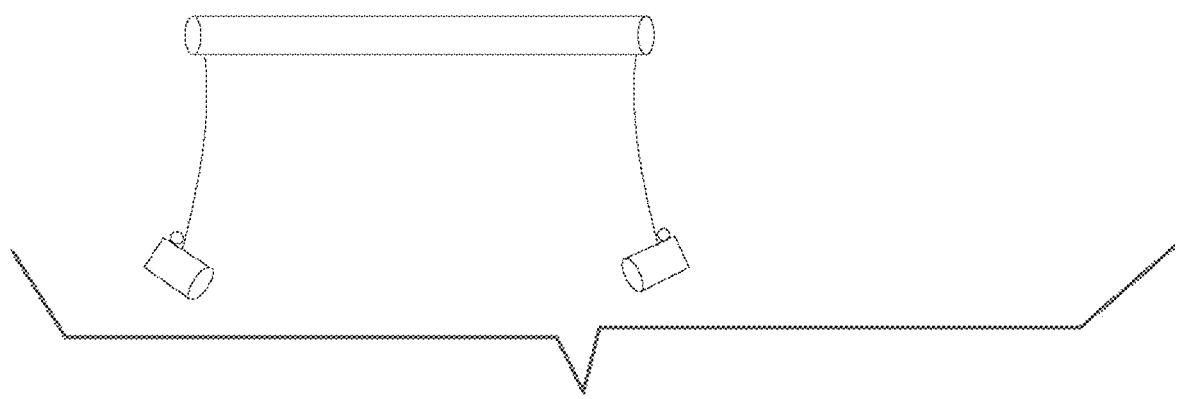
Figure 24:
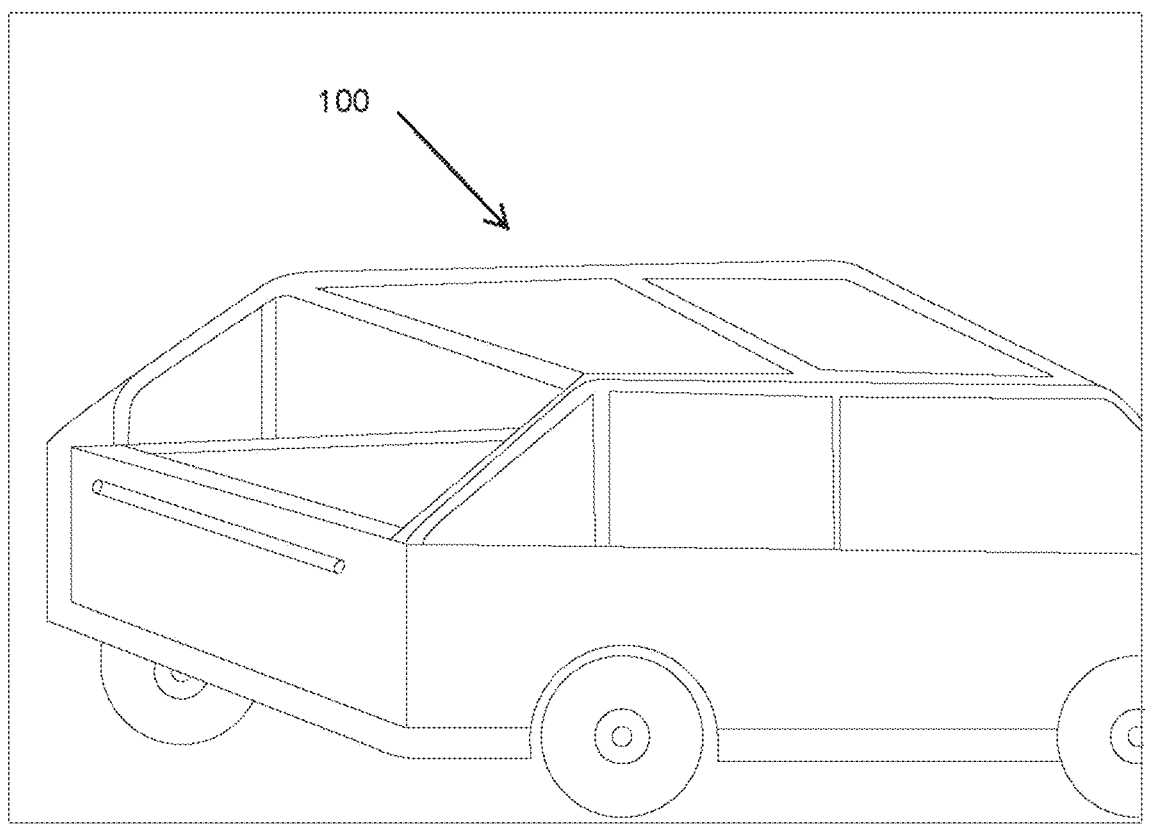
Figure 25:
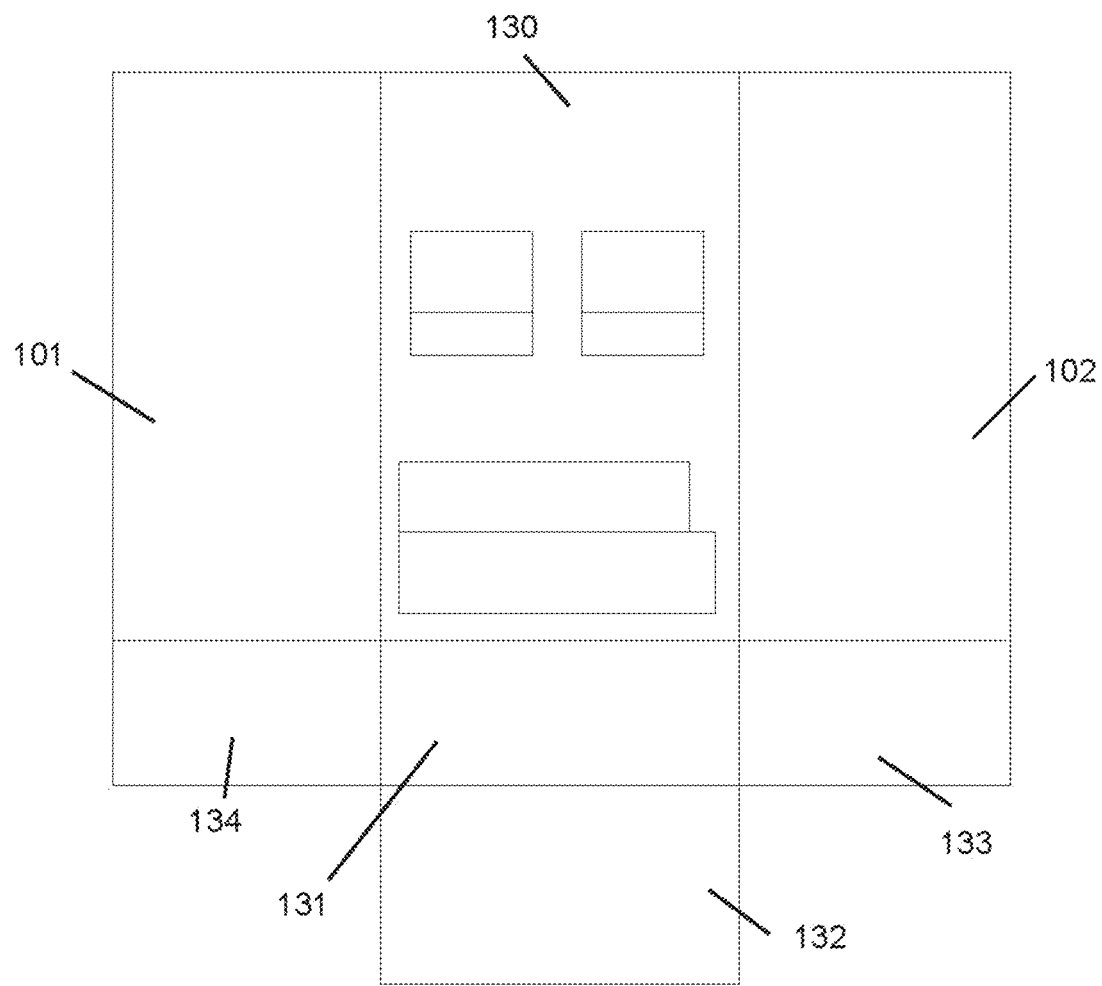
Figure 26:
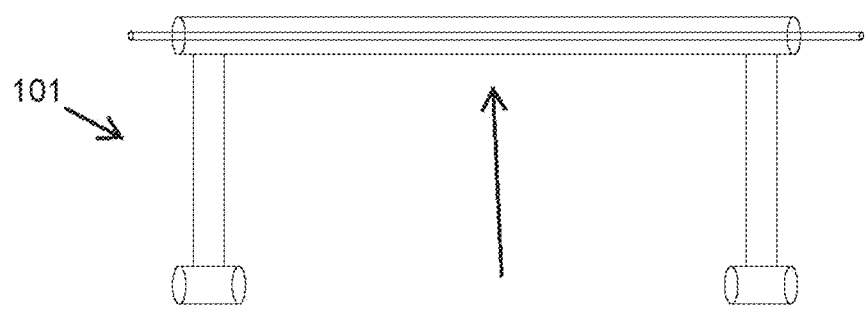
Figure 26A:
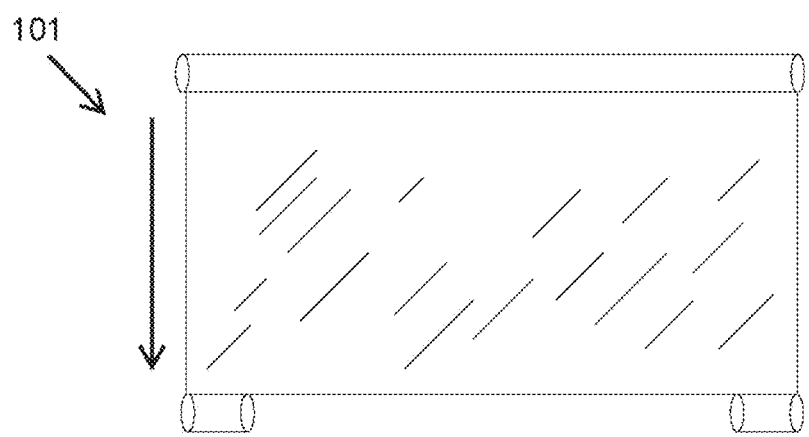
Figure 28:
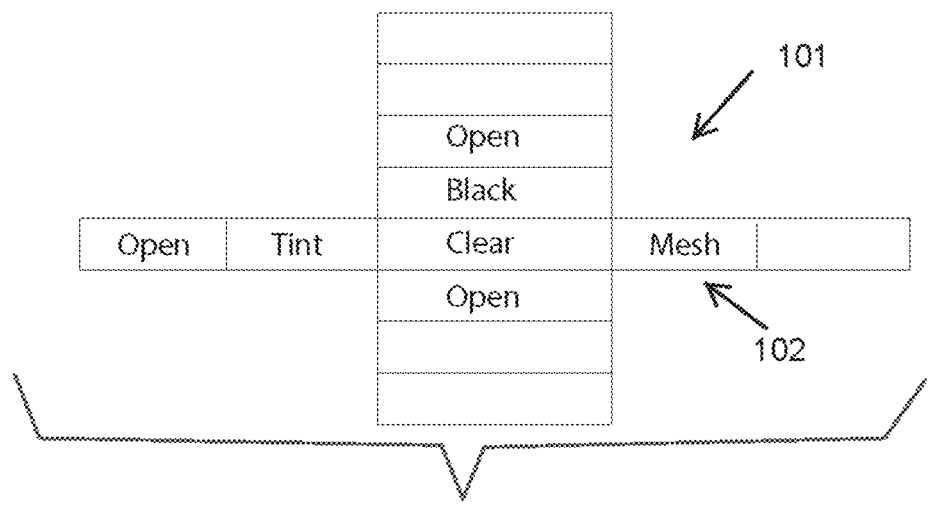
Figure 28A:
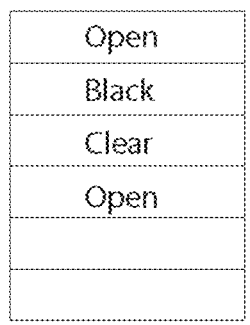
Figure 28B:
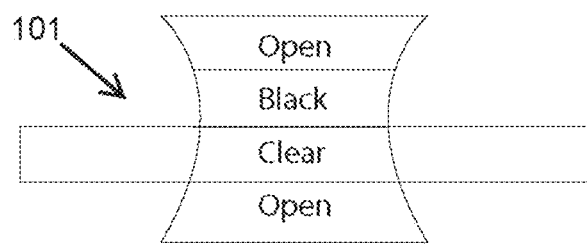
Figure 28C:
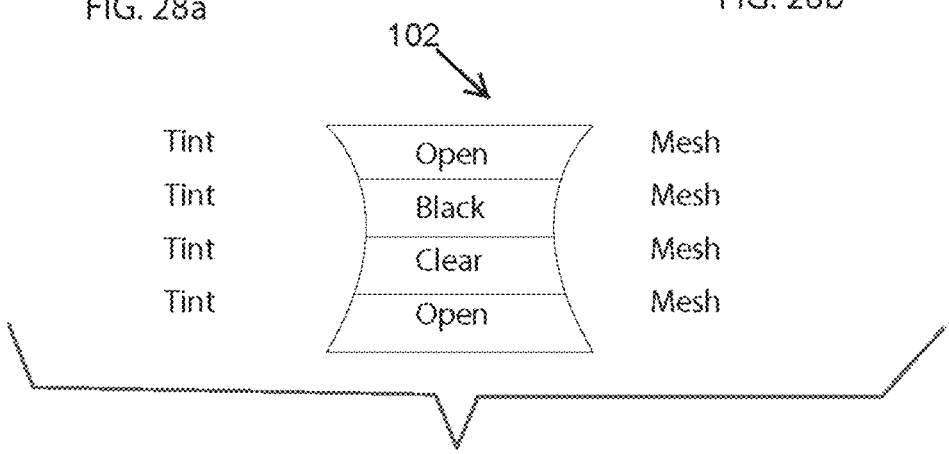
Figure 30:
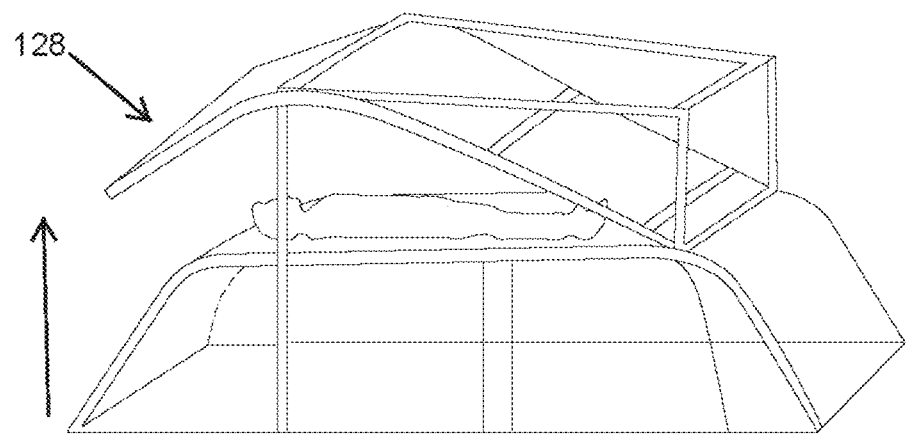
Figure 31:
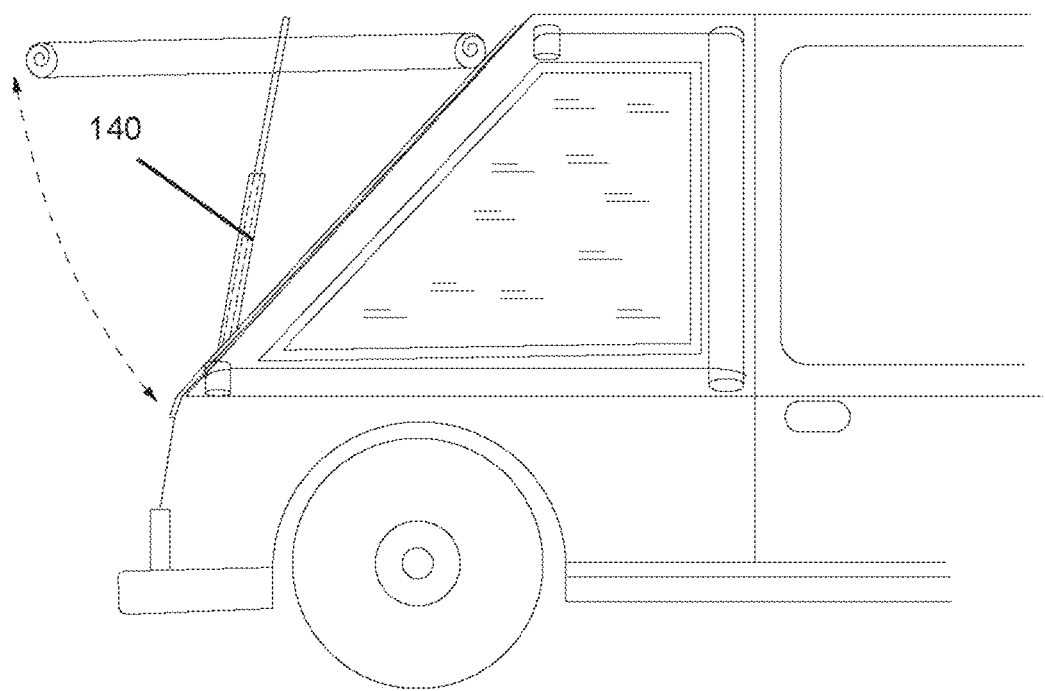
Figure 32:
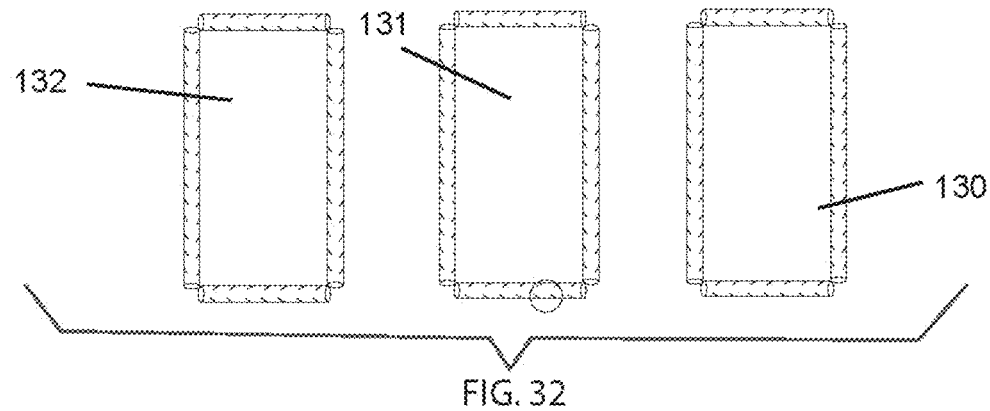
Figure 32A:
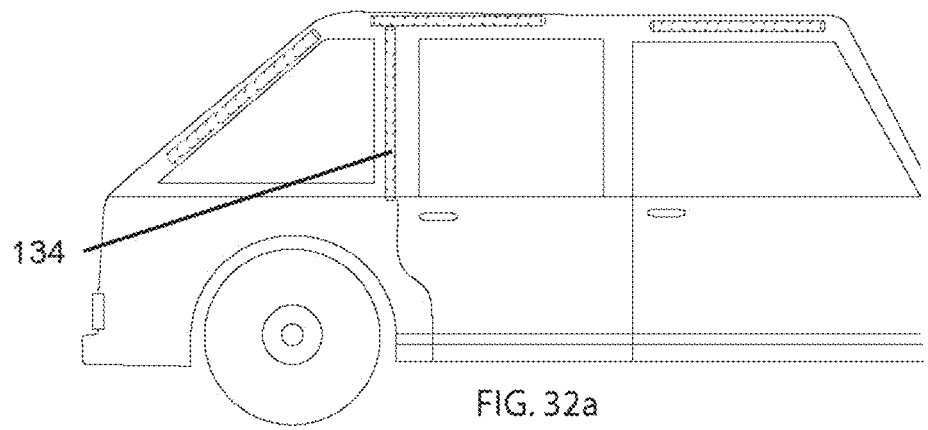
Figure 33:
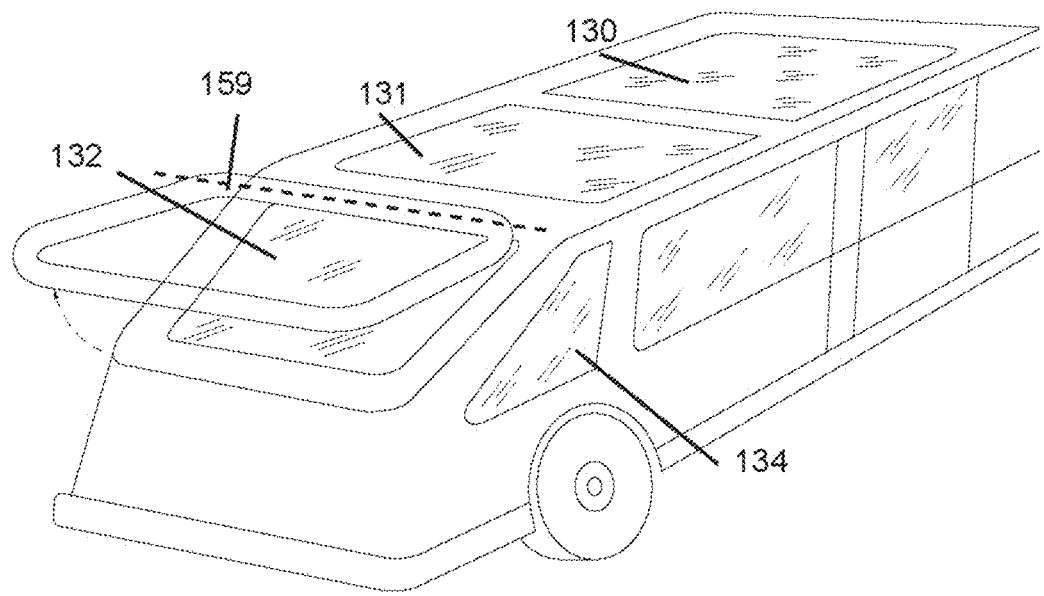
Figure 34:
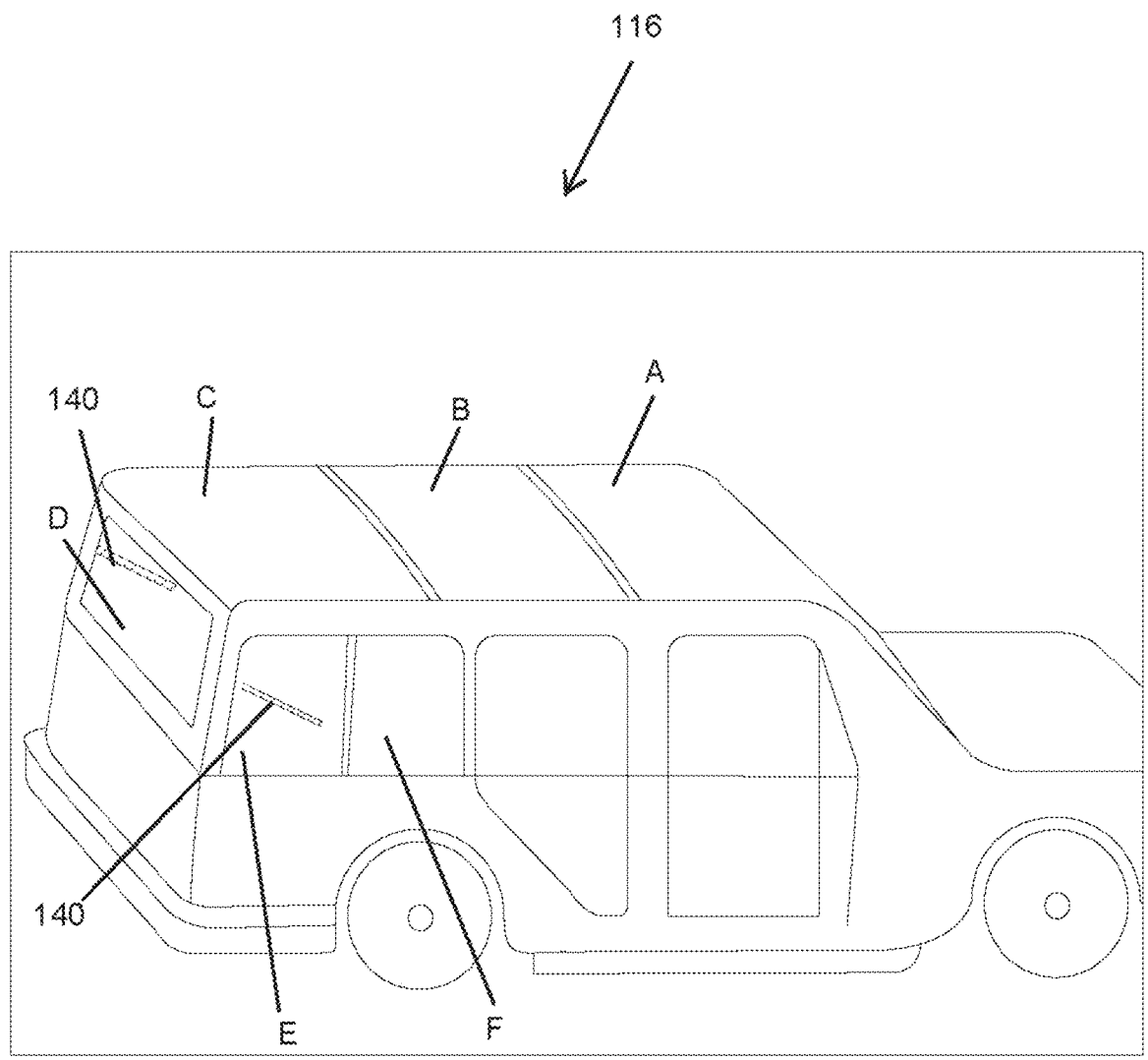
Figure 35:
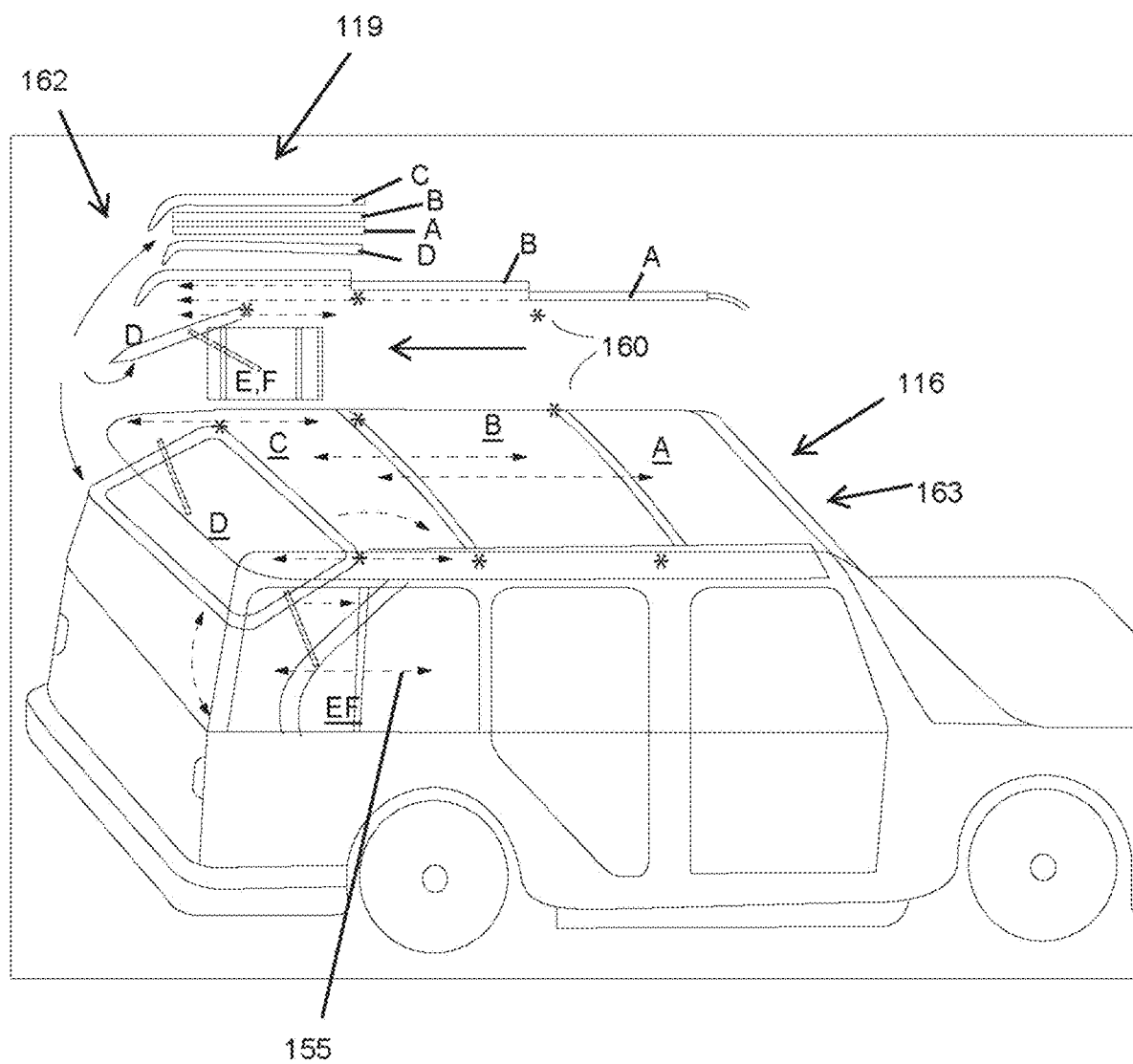
Figure 36:
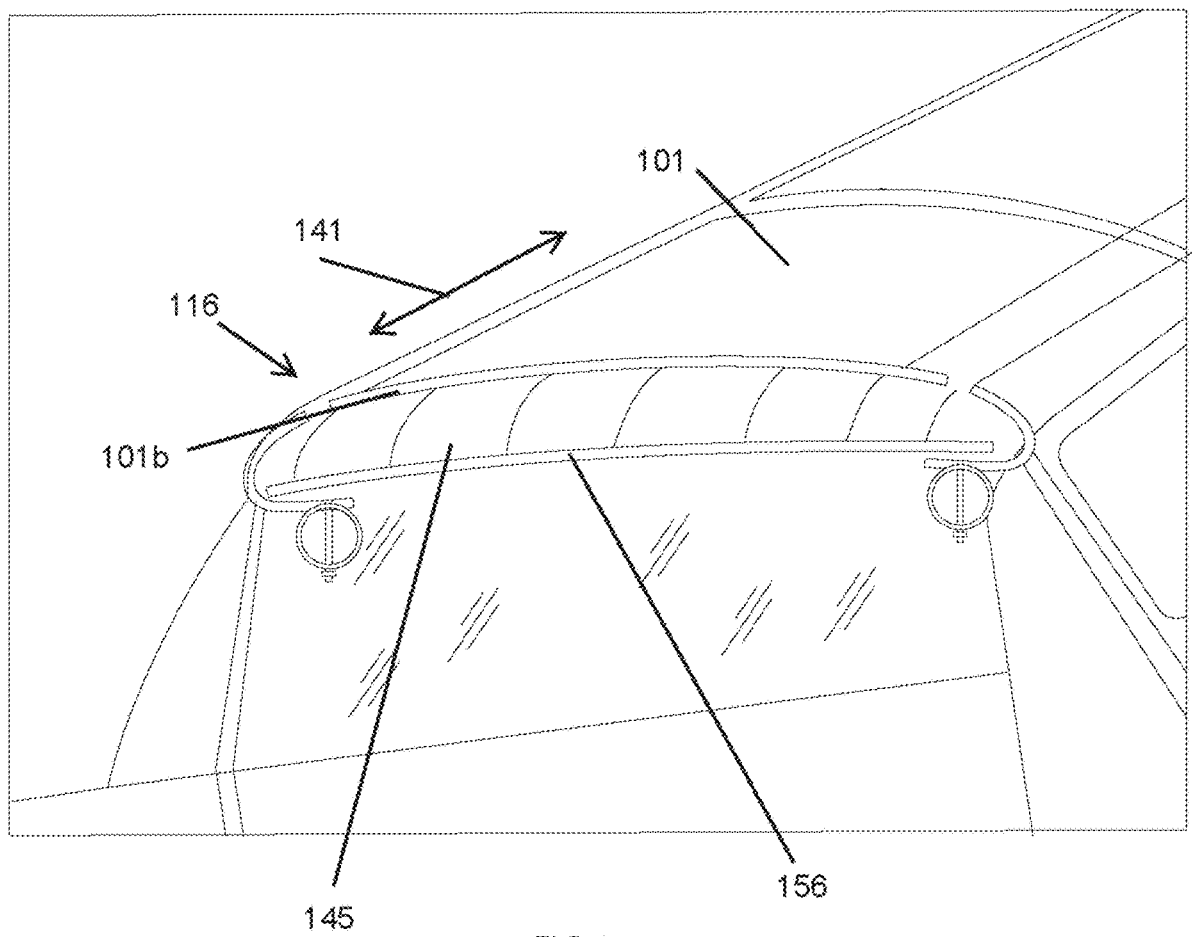
Figure 37:
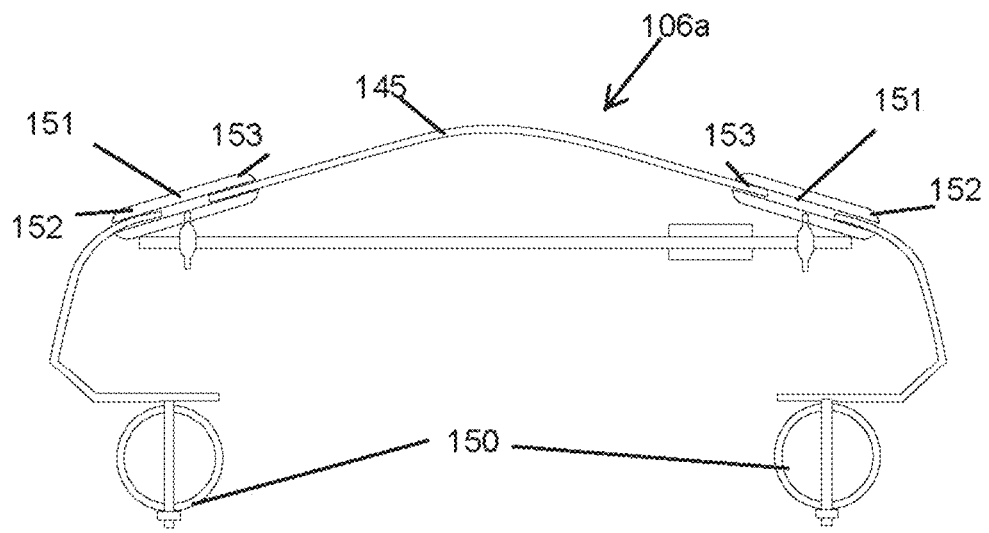
Figure 37A:
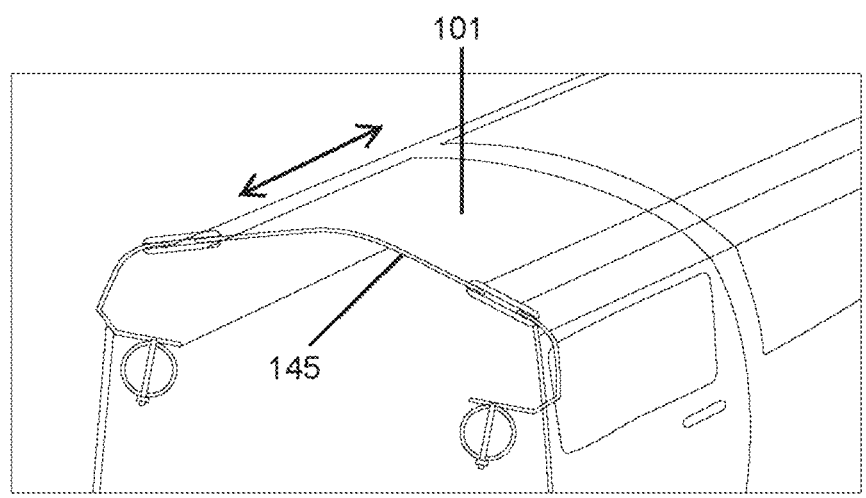
Figure 38:
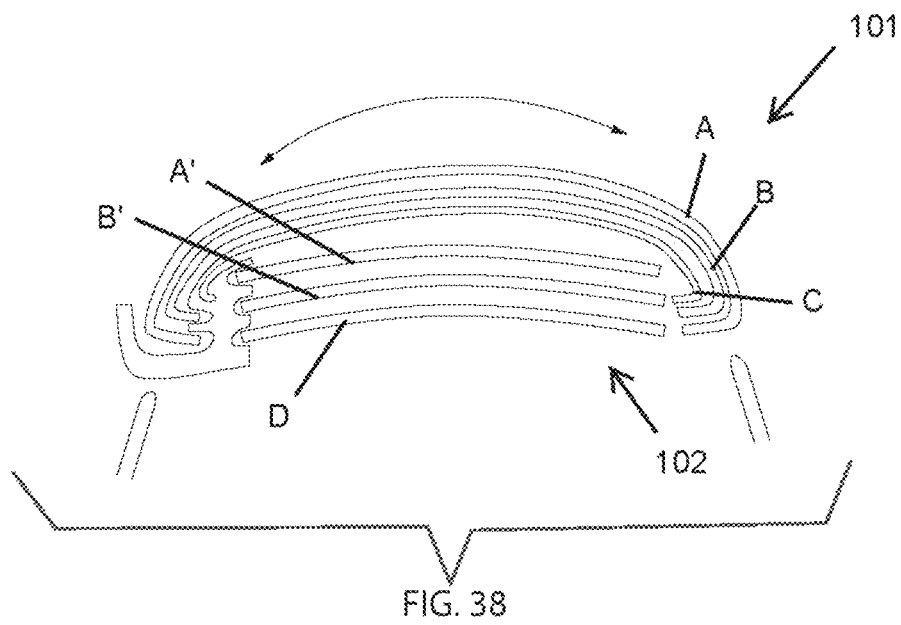
Figure 38A:
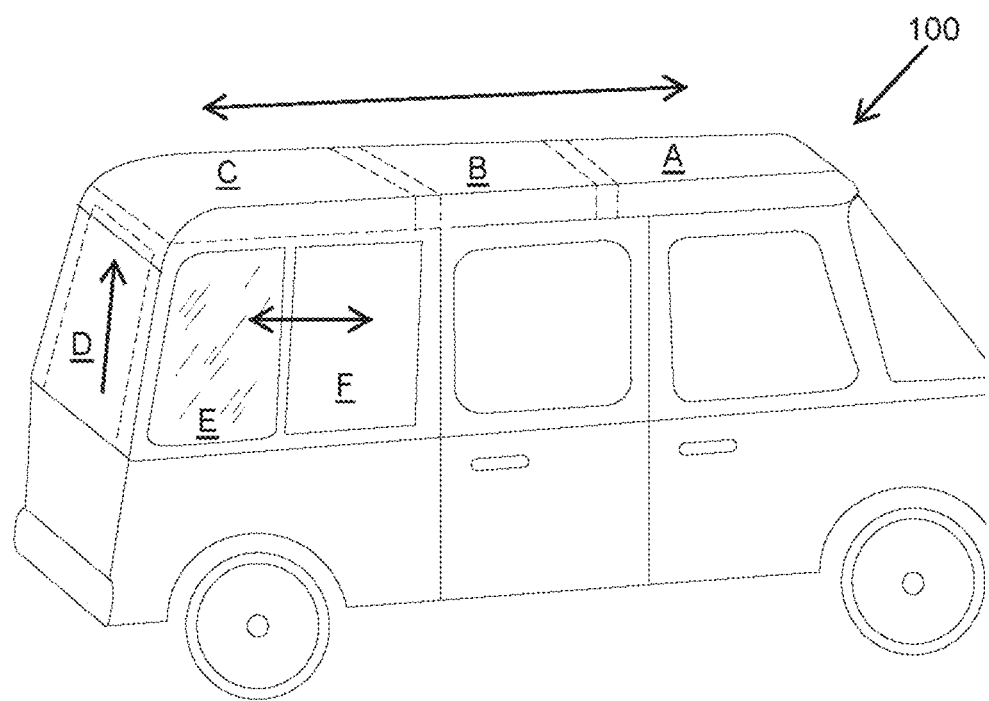
Figure 39:
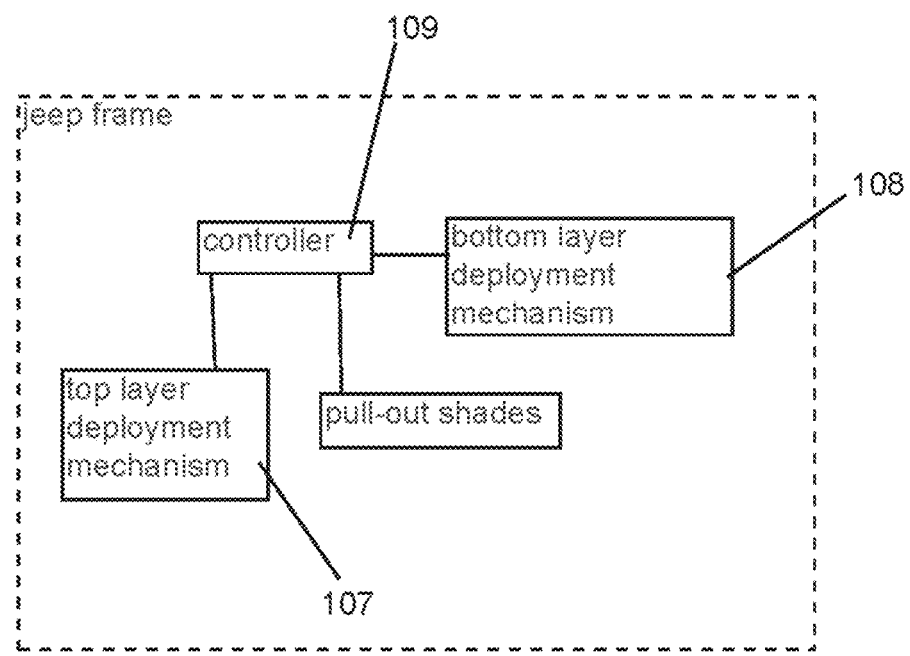

FIG. 21 is an exploded view showing the top window layer and mesh (screen) layers and transparent layers used in combination, in accordance with a non-limiting exemplary embodiment of the present disclosure FIG. 21a is a side elevational view showing the top window layer seal channeled and closed between the housing outer frame, seal frame, and a foam/rubber gasket, in accordance with a non-limiting exemplary embodiment of the present disclosure;

FIG. 21b is a side elevational view showing the top window layer seal channeled and open between the housing outer frame, seal frame, and a foam/rubber gasket, in accordance with a non-limiting exemplary embodiment of the present disclosure;

FIG. 22 is an exploded view showing the longitudinal and latitudinal layers displaced along an x-axis and y-axis, in accordance with a non-limiting exemplary embodiment of the present disclosure;

FIG. 23 are elevational views of an exterior side pull-out shade section, in accordance with a non-limiting exemplary embodiment of the present disclosure;

FIG. 24 is a perspective view showing the interrelationship between major components of the retractable JEEP® top, in accordance with a non-limiting exemplary embodiment of the present disclosure;

FIG. 25 is a top plan view of exterior side pull-out shade sections, in accordance with a non-limiting exemplary embodiment of the present disclosure;

FIG. 26 is a front elevational view of an exterior side pull-out shade section that is spring loaded and retracted to an open position, in accordance with a non-limiting exemplary embodiment of the present disclosure;

FIG. 26a is a front elevational view of an exterior side pull-out shade section that is spring loaded and extracted to a closed position, in accordance with a non-limiting exemplary embodiment of the present disclosure;

FIG. 27 is a top plane view of a pivotally actuated retractable JEEP® top frame for enabling a user to watch the night sky, in accordance with a non-limiting exemplary embodiment of the present disclosure;

FIG. 27a is a partial side elevational view of the pivotally actuated retractable JEEP® top frame shown in FIG. 27 for enabling a user to watch the night sky, in accordance with a non-limiting exemplary embodiment of the present disclosure;

FIG. 27b is a perspective view of the pivotally actuated retractable JEEP® top frame shown in FIG. 27 for enabling a user to watch the night sky, in accordance with a non-limiting exemplary embodiment of the present disclosure;

FIG. 27c is another perspective view of the pivotally actuated retractable JEEP® top frame shown in FIG. 27 for enabling a user to watch the night sky, in accordance with a non-limiting exemplary embodiment of the present disclosure;

FIG. 28 is a schematic diagram illustrating a configuration of various sections of the top window layer and mesh (screen) layer, each displaced between wound and unwound positions, in accordance with a non-limiting exemplary embodiment of the present disclosure;

FIG. 28a is another schematic diagram illustrating another configuration of various sections of the top window layer and mesh (screen) layer, each displaced between wound and unwound positions, in accordance with a non-limiting exemplary embodiment of the present disclosure;

FIG. 28b is another schematic diagram illustrating another configuration of various sections of the top window layer and mesh (screen) layer, each displaced between wound and unwound positions, in accordance with a non-limiting exemplary embodiment of the present disclosure;

FIG. 28c is another schematic diagram illustrating another configuration of various sections of the top window layer and mesh (screen) layer, each displaced between wound and unwound positions, in accordance with a non-limiting exemplary embodiment of the present disclosure;

FIG. 29 is an enlarged side elevational view of a dual-sided (front and back) spring-actuated sealing mechanism for the top window layer, which is in accordance with a non-limiting exemplary embodiment of the present disclosure;

FIG. 29a is a perspective view of one side (front or back) of the dual-sided spring-actuated sealing mechanism shown in FIG. 29b, in accordance with a non-limiting exemplary embodiment of the present disclosure;

FIG. 29b is a top plane view of the dual-sided (front and back) spring-actuated sealing mechanism that meets in the middle of the longitudinal axis, in accordance with a non-limiting exemplary embodiment of the present disclosure;

FIG. 30 is a perspective view of a retractable JEEP® top for enabling a user to sleep under the canopy and on top of the JEEP® roof, in accordance with a non-limiting exemplary embodiment of the present disclosure;

FIG. 31 is a side elevational view of a retractable JEEP® top retrofitted at a cargo/trunk hatch back section of the JEEP®, in accordance with a non-limiting exemplary embodiment of the present disclosure;

FIG. 32 is a top plan view showing front section, back section, and a cargo/trunk hatch back section of the JEEP®, in accordance with a non-limiting exemplary embodiment of the present disclosure;

FIG. 32a is a side elevational view showing front section, back section, and a cargo/trunk hatch back section of FIG. 32, in accordance with a non-limiting exemplary embodiment of the present disclosure;

FIG. 33 is a perspective view showing front section, back section, and a cargo/trunk hatch back section of FIG. 32a, in accordance with a non-limiting exemplary embodiment of the present disclosure;

FIG. 34 is a perspective view of the retractable JEEP® top with hydraulic or pneumatic pistons located in the rear for lifting/lowering the cargo/trunk hatch back section, in accordance with a non-limiting exemplary embodiment of the present disclosure;

FIG. 35 is an exploded view of the retractable JEEP® top shown in FIG. 34, in accordance with a non-limiting exemplary embodiment of the present disclosure;

FIG. 36 is a perspective view of the retractable JEEP® top attached to a front windshield, in accordance with a non-limiting exemplary embodiment of the present disclosure;

FIG. 37 is a front elevational view showing the interrelationship of select components of the retractable JEEP® top, in accordance with a non-limiting exemplary embodiment of the present disclosure;

FIG. 37a is a perspective view of the retractable JEEP® top shown in FIG. 37, in accordance with a non-limiting exemplary embodiment of the present disclosure;

FIG. 38 is a cross-sectional view showing the stackable configuration of the retractable JEEP® top, in accordance with a non-limiting exemplary embodiment of the present disclosure;

FIG. 38a is a perspective view showing the front, back, and cargo/trunk hatch back portion of the stackable sections shown in FIG. 38, in accordance with a non-limiting exemplary embodiment of the present disclosure; and FIG. 39 is a schematic block diagram showing the interrelationship between selected major components of the present disclosure, in accordance with a non-limiting exemplary embodiment of the present disclosure, Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

The non-limiting exemplary embodiment(s) is/are referred to generally in FIGS. 1-39 and is/are intended to provide a specially configured multi-functional retractable JEEP® top 100 for selectively and independently deploying a top layer 101 at tensioned positions, a bottom (mesh (screen)) layer 102, and an exterior side pull-out shade 104, as desired by a user. It should be understood that the exemplary embodiment(s) may be used with a variety of JEEP®, and should not be limited to any particular JEEP® described herein. The term JEEP® means a series of motorized land vehicles having 4-wheel drive capabilities and off-road driving capabilities, and manufactured by the FIAT® CHRYSLER® Automobiles (FCA) corporation. The terms "®" and "®" are interchangeably used.

Referring to FIGS. 1-39 in general, in a non-limiting exemplary embodiment(s), the multi-functional retractable JEEP® top 100 includes a support frame 105 affixed to a top opening 106a of an existing JEEP® 106, a top layer deployment section 107 selectively biased between wound and unwound positions, a bottom layer deployment section 108 disposed subjacent to the top layer deployment section 107 and each being independently biased between wound and unwound positions, a controller 109 for manipulating the top layer deployment section 107 and the bottom layer deployment section 108 upon receiving a user input, and a power source communicatively coupled to the controller 109. It is noted that the top layer deployment section 107 may contain substantially similar components as the bottom layer deployment section 108. Advantageously, each of the top layer deployment section 107 and the bottom layer deployment section 108 span across at least one portion of the top opening 106a of the existing JEEP® 106. Such a structural configuration yields the new, useful, and unpredicted result of ensuring the top window layer 101 and mesh (screen)

layer 102 are succinctly opened and closed as well as water-sealed when at a closed position 116.

In a non-limiting exemplary embodiment, the top layer deployment section 107 and the bottom layer deployment section 108 may each include motorized gears levers, pulleys, cables, etc. to displace the top window layer 101 and bottom layer 102 between the open and closed positions, 119, 116, respectively.

In a non-limiting exemplary embodiment, the top layer deployment section 107 includes a top window layer 101, a header 158 statically mated to a leading edge 101a of the top window layer 101 wherein the header 158 includes a plurality of slits 209 therein and is flexibly configured to provide an angled press seal 120a (via a housing 120 edge and roll tensioners 110) against the top window layer 101 when deployed to the open position 119. The plurality of roll tensioners 110 are attached to the support frame 105 and operably engaged to the top window layer 101 for rotatably flexing and tensioning the header 158 to thereby seal the top window layer 101 against the top opening 106a of the JEEP® 106 (so water and wind do not enter the JEEP® 106), and a plurality of deployment mechanisms 107, 108 are configured to selectively bias the top window layer 101 between open 119 and closed 116 positions. As noted above, power-actuated mechanisms 107, 108 may be employed. Advantageously, the header 158 spans between the roll tensioners 110 and travels parallel to the y-axis 111 between the deployment mechanisms 107, 108. Such a structural configuration yields the new, useful, and unpredicted result of ensuring the top window layer 101 and mesh (screen) layer 102 are succinctly opened and closed as well as water-sealed when at the closed position 116.

In a non-limiting exemplary embodiment, the roll tensioners 110 are equidistantly spaced apart on opposite sides of the y-axis 111. Each roll tensioner 110 includes a cylindrical hollow tube 112 having a slit 113 extended along a major longitudinal length thereof, and a spring-coiled spool 114 housed within the cylindrical hollow tube 112 and axially aligned along the major longitudinal length thereof. Advantageously, opposed longitudinal edges of the top window layer 101 each are channeled through the slit 113 and anchored to the spring-coiled spool 114 such that the top window layer 101 travels parallel to the y-axis 111 when actuated by the deployment mechanisms 107, 108. Each of the top window layer 101 and bottom layer 102 have rubber longitudinal side edges that are frictionally intercalated between an edge of the housing 120 and frame 105 and roll tensioner 110. Such a structural configuration yields the new, useful, and unpredicted result of ensuring the top window layer 101 and mesh (screen) layer 102 are succinctly opened and closed as well as water-sealed when at the closed position 116.

In a non-limiting exemplary embodiment, the deployment mechanisms 107, 108 are oppositely spaced apart at axially opposed ends of the roll tensioners 110 and registered orthogonal thereto. Each deployment mechanism includes a housing 120, and a spring-coiled spool 114 rotatably disposed within the housing 120, and a header 158 pull line anchored to the header 158 and wound about one of the spring-coiled spools 114 disposed within one of the housings 120. Such a structural configuration yields the new, useful, and unpredicted result of ensuring the top window layer 101 and mesh (screen) layer 102 are succinctly opened and closed as well as water-sealed when at the closed position 116.

In a non-limiting exemplary embodiment, the roll tensioners 110 cooperate with the top layer deployment section 107 and are configured to maintain the top window layer 101 at a first tensioned position 115, when the top window layer 101 is at a wound closed position 116, and thereafter biased to a second tensioned position 117 when the top window layer 101 is an unwound open position 119. Such a structural configuration yields the new, useful, and unpredicted result of ensuring the top window layer 101 and mesh (screen) layer 102 are succinctly opened and closed as well as water-sealed when at the closed position 116.

In a non-limiting exemplary embodiment, the second tensioned position 117 is greater than the first tensioned position 115 thereby causing the header 158 to rise (bend) upwardly to a bowed position 121 (concave position) for maintaining the top window layer 101 sealed at the top opening 106a of the JEEP® 106. Such a structural configuration provides the new, useful, and unexpected benefit of stabilizing the top window layer 101 and preventing undesirable top layer 101 flapping during driving conditions. Also, such a structural configuration yields the new, useful, and unpredicted result of ensuring the top window layer 101 and mesh (screen) layer 102 are succinctly opened and closed as well as water-sealed when at the closed position 116.

In a non-limiting exemplary embodiment, each of the cylindrical hollow tubes 112 have a proximal end 112a and an axially opposed distal end 112b. Advantageously, during deployment of the top window layer 101 to the open position 119, the proximal end 112a rotates about a fulcrum rotational axis 123, while the distal end 112b contemporaneously rotates about the fulcrum rotational axis 123 as well as linearly travels medially and parallel to the x-axis 124 towards a center point 125 between the roll tensioners 110 such that the header 158 is flexed upwardly to the bowed position 121 at the second tensioned position 117. Such a structural configuration yields the new, useful, and unpredicted result of ensuring the top window layer 101 and mesh (screen) layer 102 are succinctly opened and closed as well as water-sealed when at the closed position 116. Aperture 260 at roll tensioner 110 receives an end of the header 158 and maintains a rotational frictional grip therewith during rotation between closed 116 and open 119 positions.

In a non-limiting exemplary embodiment, during retraction of the top window layer 101 to the closed position 116, the proximal end 112a oppositely rotates about the fulcrum rotational axis 123, while the distal end 112b contemporaneously rotates opposite about the fulcrum rotational axis 123 as well as linearly travels laterally and parallel to the x-axis 124 away from the center point 125 between the roll tensioners 110 such that the header 158 is relaxed downwardly to a planar (non-bowed) position 126 at the first tensioned position 115. Such a structural configuration yields the new, useful, and unpredicted result of ensuring the top window layer 101 and mesh (screen) layer 102 are succinctly opened and closed as well as water-sealed when at the closed position 116.

In a non-limiting exemplary embodiment, the present disclosure further includes at least one exterior side pull-out shade 104 section anchored to the support frame 105 and disposed generally above a door of the existing JEEP® 106. Such an exterior side pull-out shade 104 is independently operable of the top layer deployment section 107 and the bottom layer deployment section 108. Advantageously, the at least one exterior side pull-out shade 104 section is operably coupled to the controller 109 and is configured to deploy outwardly and away from the door of the existing JEEP® 106. The same or dedicated motors may be used for operating multiple exterior side pull-out shade 104 sections.

Such a structural configuration yields the new, useful, and unpredicted result of ensuring the top window layer 101 and mesh (screen) layer 102 are succinctly opened and closed as well as water-sealed when at the closed position 116.

In a non-limiting exemplary embodiment, the present disclosure further includes a JEEP® top lifting section 128 for selectively raising and lowering a rear portion of the top layer deployment section 107 to a height above an initial resting position 143. Such a structural configuration yields the new, useful, and unpredicted result of allowing a user to open and close a window layer 101 at the cargo/trunk hatch back section of the JEEP® 106.

In a non-limiting exemplary embodiment, as perhaps best shown in FIGS. 34-38a, the multi-functional retractable JEEP® top 100 includes a support frame 105 affixed to a top opening 106a of an existing JEEP® 106 wherein the support frame 105 is configured to operably support five separate windows. For example, the support frame 105 may dynamically displace one or more of a front window 130, a back window 131, a rear hatch window 132, a left-side rear hatch window 133, and a right-side rear hatch window 134. Each of the five windows may have at least one top window layer 101, and a bottom scrolling layer 102 (e.g., mesh layer, tinted layer, clear layer, exposed (open) layer, etc.). Additional side windows may also include an exterior side pull-out shade 104. Such a structural configuration yields the new, useful, and unpredicted result of allowing a user to selectively open and close desired window sections of the JEEP® top 100.

In a non-limiting exemplary embodiment, the front window 130 and back window 131 each may have a plurality of bottom scrolling layer 102 such that a user can selectively manipulate and customize a configuration of the bottom scrolling layer 102 as needed. For example, the bottom scrolling layer 102 may be tinted on a passenger side and clear (open) on a driver side of the front window 130 and back window 131. A variety of configurations may be employed. Each portion of the scrolling layer 102 may be contiguously attached and configured in a continuous pattern as desired.

In a non-limiting exemplary embodiment, the rear hatch window 132 may also have a plurality of bottom scrolling layers 102 as described hereinabove. In addition, the rear hatch window 132 may articulate about a fulcrum rotational axis 159 and operate via a plurality of pneumatic pistons 140 anchored to the support frame 105, as shown in FIG. 33. Such a structural configuration yields the new, useful, and unpredicted result of allowing the user to independently open and closed the rear hatch section of the JEEP® cargo/trunk.

In a non-limiting exemplary embodiment, referring to FIGS. 32-35, each of the left-side 133 and right-side 134 hatch windows slidably reciprocate, between open and closed positions, along a linear longitudinal path 155 defined parallel to left and right sides of the vehicle. Such a structural configuration yields the new, useful, and unpredicted result of enabling a user to independently open and close the side windows as desired.

In a non-limiting exemplary embodiment, referring to FIGS. 28-28c, the five windows are illustrated at an initial resting position 143. Deployment of such windows are illustrated in FIG. 35-38a. In particular, window C may remain stationery and windows A and B may rearwardly retract beneath window C. In this manner, windows A and B stop when each is horizontally stacked beneath window C. Window D initially articulates to a horizontal position, then forwardly retracts beneath window C such that window D is horizontally stacked and aligned with windows A-C. A variety of deployment mechanisms 107, 108 may be employed to slidably retract windows A, B, and D to the horizontally stacked orientation shown in FIGS. 35 and 38. For example, longitudinal guide rails may direct rotational gears 160 along linear longitudinal travel paths for each of the dynamic windows. It is noted that window C may be stationary, while windows A, B, and D may be dynamic. However, the window deployment configuration may be calibrated to allow any one of windows A-D to remain stationary. Also, the arrangement of windows A-D may be altered such that they are stacked in a different order. Such a structural configuration yields the new, useful, and unpredicted result of customizing the window configurations.

In a non-limiting exemplary embodiment, referring to FIGS. 35-38, window F may remain stationery while window E contemporaneously reciprocates along a linear longitudinal path 141 as window D reciprocates between its horizontally stacked position (open) 162 and initial resting position (closed) 163. Window E is located on both left and right sides of the vehicle and may operate in tandem with window D. Guide brackets are attached to the vehicle support frame 105 and rear hatch window D. Of course, window E may be disconnected from window D, if desired. Such a structural configuration yields the new, useful, and unpredicted result of customizing the window configurations.

In a non-limiting exemplary embodiment, referring to FIG. 36-37a, a perspective view of the vehicle's front windshield is shown wherein a top portion of the front windshield includes an arcuately shaped plastic molding 145 spanning across a width of the front windshield. Such a plastic molding 145 seals a leading edge 101b of the top window layer 101 to the upper edge of the front windshield 156. In this manner, the arcuately shaped plastic molding 145 serves as a coupling that receives the leading edge 101b of the dynamic top window layer 101 as it returns to a retracted (closed) position 116 adjacent to the front windshield 156. Such a structural configuration yields the new, useful, and unpredicted result of ensuring the top window layer 101 and mesh (screen) layer 102 are succinctly opened and closed as well as water-sealed when at the closed position 116.

In a non-limiting exemplary embodiment, referring to FIGS. 37-38a, a cross-sectional view and a perspective view of the deployment mechanisms 107, 108 are illustrated. The support frame 105 is anchored to the vehicle's roll bars 150 on the left side and right side of the vehicle. A plurality of brackets 151 are operably engaged and coupled to the support frame 105 and the top window layer 101, respectively. Each bracket 151 includes a lateral groove 152 and an oppositely facing medial groove 153. The medial groove 153 is statically attached to a left side and a right side of the top window layer 101. The lateral groove 152 is dynamically engaged to an inwardly facing edge of the support frame 105. In this manner, the bracket 151 and the top window layer 101 are contemporaneously guided along the inwardly facing edges of the support frame 105 and thereby reciprocated between open and closed positions 116, 119. Of course, such brackets 151 and the top window layer 101 may be displaced via a variety of deployment mechanisms 107, 108 including motorized gears tracks, pulleys, rollers, etc. Such a structural configuration yields the new, useful, and unpredicted result of ensuring the top window layer 101 and mesh (screen) layer 102 are succinctly opened and closed as well as water-sealed when at the closed position 116, as well as stacked in space-limited areas at the JEEP® top opening 106a.

As perhaps best shown in FIGS. 21-21b, each of the top window layer 101 and bottom layer 102 are sealed against the frame 105 when a lower portion of the frame 105a engages an upper frame 105b and frictionally engage the longitudinal edges of the top window layer 101 and bottom layer 102 therebetween. Of course, separate frames 105 may be employed to separately engage the top layer 101 and bottom layer 102 so each layer 101, 102 can be independently wound and unwound as needed. The lower portion of the frame 105a may be manually raised and lowered or power actuated.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. A multi-functional retractable land vehicle top comprising:
    a support frame engaged to a top opening of an existing land vehicle;
    a top layer deployment section biased between wound and unwound positions;
    a bottom layer deployment section disposed subjacent to said top layer deployment section and independently biased between wound and unwound positions;
    a controller for manipulating said top layer deployment section and said bottom layer deployment section upon receiving a user input; and
    a power source communicatively coupled to said controller;
    wherein each of said top layer deployment section and said bottom layer deployment section span across at least one portion of the top opening of the existing land vehicle.

2. The multi-functional retractable land vehicle top of claim 1, wherein said top layer deployment section comprises:
    a top window layer;
    a header statically mated to a leading edge of said top window layer, said header including a plurality of slits therein and being flexibly configured to provide an angled press seal against said top window layer deployed to an open position;
    a plurality of roll tensioners attached to said support frame and operably engaged to said top window layer for flexing and tensioning said header to thereby seal said top window layer against the top opening of the land vehicle; and a plurality of deployment mechanisms configured to selectively bias said top window layer between open and closed positions;

wherein said header spans between said roll tensioners and travels parallel to a y-axis between said deployment mechanisms.

3. The multi-functional retractable land vehicle top of claim 2, wherein said roll tensioners are equidistantly spaced apart on opposite sides of the y-axis, each said roll tensioner comprises:

a cylindrical hollow tube having a slit extended along a major longitudinal length thereof; and a spring-coiled spool housed within said cylindrical hollow tube and axially aligned along the major longitudinal length thereof;

wherein opposed longitudinal edges of said top window layer each are channeled through said slit and anchored to said spring-coiled spool such that said top window layer travels parallel to the y-axis when actuated by said deployment mechanisms.

4. The multi-functional retractable land vehicle top of claim 3, wherein said deployment mechanisms are oppositely spaced apart at axially opposed ends of said roll tensioners and registered orthogonal thereto, each of said deployment mechanisms comprises:

a housing, and a spring-coiled spool rotatably disposed within said housing; and a header pull line anchored to said header and wound about one of said spring-coiled spools disposed within one of said housing.

5. The multi-functional retractable land vehicle top of claim 4, wherein said roll tensioners cooperate with said top layer deployment section and are configured to maintain said top window layer at a first tensioned position when said top window layer is at a wound closed position, and biased to a second tensioned positioned when said top window layer is an unwound open position.

6. The multi-functional retractable land vehicle top of claim 5, wherein said second tensioned position is greater than said first tensioned position thereby causing said header to rise upwardly to a bowed position for maintaining said top window layer sealed at the top opening of the land vehicle.

7. The multi-functional retractable land vehicle top of claim 6, wherein each of said cylindrical hollow tubes have a proximal end and an axially opposed distal end;

wherein, during deployment of said top window layer to the open position, said proximal end is configured to rotate about a fulcrum rotational axis while said distal end contemporaneously rotates about the fulcrum axis and linearly travels parallel to the x-axis towards a center point between said roll tensioners such that said header is flexed upwardly to a bowed position at said second tensioned position.

8. The multi-functional retractable land vehicle top of claim 7, wherein, during retraction of said top window layer to the closed position, said proximal end is configured to oppositely rotate about the fulcrum rotational axis while said distal end contemporaneously rotates opposite about the fulcrum axis and linearly travels parallel to the x-axis away from said center point between said roll tensioners such that said header is relaxed downwardly to a planar position at said first tensioned position.

9. The multi-functional retractable land vehicle top of claim 1, further comprising:

at least one exterior side pull-out shade section anchored to said support frame and disposed generally above a door of the existing land vehicle, said at least one exterior side pull-out shade being independently operable of said top layer deployment section and said bottom layer deployment section;

wherein said at least one exterior side pull-out shade section is operably coupled to said controller and is configured to deploy outwardly and away from the door of the existing land vehicle.

10. The multi-functional retractable land vehicle top of claim 1, further comprising:

a land vehicle top lifting section for selectively raising and lowering a rear portion of said top layer deployment section to height above an initial resting position.

11. A multi-functional retractable land vehicle top comprising:

a support frame affixed to a top opening of an existing land vehicle;

a top layer deployment section selectively biased between wound and unwound positions;

a bottom layer deployment section disposed subjacent to said top layer deployment section and independently biased between wound and unwound positions;

a controller for manipulating said top layer deployment section and said bottom layer deployment section upon receiving a user input; and a power source communicatively coupled to said controller;

wherein each of said top layer deployment section and said bottom layer deployment section span across at least one portion of the top opening of the existing land vehicle.

\* \* \* \* \*